United States Patent [19]
Beam et al.

[11] Patent Number: 5,955,880
[45] Date of Patent: *Sep. 21, 1999

[54] SEALLESS PUMP ROTOR POSITION AND BEARING MONITOR

[76] Inventors: Palmer H. Beam, 9763 Carr Cir., Westminster, Colo. 80021; David J. Belanger, 1921 Bonnie La., Waukesha, Wis. 53188; George J. Eilers, 1110 W. Meadow Rd., Evergreen, Colo. 80439; Joseph Imlach, 460 Falke Ct., Anchorage, Ak. 99504

[*] Notice: This patent issued on a continued prosecution application filed under 37 CFR 1.53(d), and is subject to the twenty year patent term provisions of 35 U.S.C. 154(a)(2).

[21] Appl. No.: 08/760,003

[22] Filed: Dec. 5, 1996

[51] Int. Cl.⁶ .......................... G01R 33/00; G01M 13/04
[52] U.S. Cl. ............................... 324/207.17; 324/207.18; 324/207.22
[58] Field of Search .......................... 324/207.11, 207.15, 324/207.16, 207.17, 207.18, 207.19, 207.22, 207.23, 207.24, 207.25; 340/682

[56] References Cited

U.S. PATENT DOCUMENTS

| | | | |
|---|---|---|---|
| 1,480,848 | 1/1924 | Walsh . | |
| 2,939,074 | 5/1960 | Perrett | 324/51 |
| 2,949,576 | 8/1960 | Bolton | 323/75 |
| 3,079,548 | 2/1963 | Robinson | 323/109 |
| 3,100,989 | 8/1963 | Jones | 73/140 |

(List continued on next page.)

FOREIGN PATENT DOCUMENTS

| | | |
|---|---|---|
| 0 169 633 | 1/1986 | European Pat. Off. . |
| 0 443 514 A2 | 8/1991 | European Pat. Off. .......... G01B 7/14 |
| 0 506 898 | 12/1994 | European Pat. Off. . |
| 0672886A2 | 9/1995 | European Pat. Off. .......... G01B 7/00 |
| 95301114 | 9/1995 | European Pat. Off. . |
| 0 759 544 A1 | 2/1997 | European Pat. Off. . |

(List continued on next page.)

OTHER PUBLICATIONS

O'Connor, Leo; "*Active Magnetic Bearings Give Systems a Lift*"; Mechanical Engineering; Jul. 1992; pp. 52–54.
Weise, David A. & Tome, David M.; "*Magnetic Bearings Attract Attention*"; Power Transmission Design, pp. 21–22.
Noltingk, B.E.; "*Instrumentation Reference Book*"; Second Edition; Butterworth Heinemann, no date.

(List continued on next page.)

*Primary Examiner*—Michael Brock
*Attorney, Agent, or Firm*—Jeffery J. Makeever; Marshall, O'Toole, Gerstein, Murray & Borun

[57] ABSTRACT

A bearing monitor for use with a canned motor pump having a wound stator and a rotor drivably coupled to an impeller, the rotor being mounted on radial journal bearings and axial thrust bearings within a containment can comprises a first and a second target embedded in an outer periphery of the rotor in axial proximity to a first and a second end of the rotor. The monitor includes a plurality of sensors mounted external to the containment can in axial proximity to each of the two targets and radially displaced approximately equally around the periphery of the containment can. A plurality of magnetic field generators create local magnetic fields coupled through the containment can, process fluid, rotor, and at least a portion of one target to one of the sensors. In response to each field, each sensor generates an output signal which varies as a result in a change in the magnetic circuit reluctance caused by bearing wear. A monitor circuit is coupled to the sensors and compares their output signals to generate a scaled output which is approximately linearly related to bearing wear. The output of sensors in the same axial plane are utilized to determine bearing wear in a radial direction, while the output of sensors in different axial planes are utilized to determine bearing wear in an axial direction. Electromagnetic shielding may be used depending on the environmental and operating conditions.

30 Claims, 25 Drawing Sheets

U.S. PATENT DOCUMENTS

| | | | |
|---|---|---|---|
| 3,109,095 | 10/1963 | Van Horne | 250/83.3 |
| 3,170,112 | 2/1965 | Bungardt et al. | 324/34 |
| 3,307,164 | 2/1967 | Zimmer | 340/195 |
| 3,373,300 | 3/1968 | Sullivan | 310/68 |
| 3,381,216 | 4/1968 | Sibley, Jr. et al. | 324/34 |
| 3,541,394 | 11/1970 | Brenneman et al. | 317/99 |
| 3,613,000 | 10/1971 | Weir et al. | 324/174 |
| 3,721,842 | 3/1973 | Stevenson et al. | 310/13 |
| 3,745,509 | 7/1973 | Woodward et al. | 339/14 R |
| 3,891,918 | 6/1975 | Ellis | 324/34 D |
| 3,981,621 | 9/1976 | Considine | 417/44 |
| 3,988,624 | 10/1976 | Urban | 310/168 |
| 3,991,701 | 11/1976 | Sato | 116/114 |
| 4,059,794 | 11/1977 | Furness et al. | 324/208 |
| 4,114,960 | 9/1978 | Habermann et al. | 308/10 |
| 4,128,147 | 12/1978 | Lafuent Ruberte | 188/164 |
| 4,157,612 | 6/1979 | Rainal | 29/628 |
| 4,182,168 | 1/1980 | Desch | 73/140 |
| 4,196,613 | 4/1980 | Cole | 73/32 R |
| 4,199,718 | 4/1980 | Ikeda et al. | 324/158 MG |
| 4,211,973 | 7/1980 | Sato et al. | 324/158 |
| 4,334,189 | 6/1982 | Sato | 324/158 |
| 4,379,291 | 4/1983 | Hubbard et al. | 340/682 |
| 4,380,875 | 4/1983 | Erickson et al. | 33/203.13 |
| 4,401,946 | 8/1983 | Klimstra | 324/208 |
| 4,406,999 | 9/1983 | Ward | 340/870.31 |
| 4,423,635 | 1/1984 | Senicourt et al. | 73/593 |
| 4,473,259 | 9/1984 | Goldowsky | 308/10 |
| 4,493,042 | 1/1985 | Shima et al. | 364/507 |
| 4,563,643 | 1/1986 | Leschek et al. | 324/207 |
| 4,584,865 | 4/1986 | Hutchins | 73/7 |
| 4,639,054 | 1/1987 | Kersbergen | 339/14 R |
| 4,717,874 | 1/1988 | Ichikawa et al. | 324/207.22 X |
| 4,743,786 | 5/1988 | Ichikawa et al. | 324/207.17 X |
| 4,764,767 | 8/1988 | Ichikawa et al. | 340/870.31 |
| 4,775,947 | 10/1988 | Marron | 364/550 |
| 4,833,405 | 5/1989 | Richards et al. | 324/208 |
| 4,849,666 | 7/1989 | Hoag | 310/90.5 |
| 4,851,772 | 7/1989 | Acht et al. | 324/208 |
| 4,875,785 | 10/1989 | Santos et al. | 384/448 |
| 4,906,924 | 3/1990 | Zannis | 324/207.18 |
| 4,924,180 | 5/1990 | Nasr et al. | 324/207 |
| 4,931,728 | 6/1990 | Hata et al. | 324/207.15 |
| 4,952,874 | 8/1990 | Stadtfeld | 324/207.22 |
| 4,991,301 | 2/1991 | Hore | 33/366 |
| 4,992,733 | 2/1991 | Griebeler | 324/207.21 |
| 5,006,797 | 4/1991 | Smith | 324/173 |
| 5,027,819 | 7/1991 | Crum | 128/653 |
| 5,036,236 | 7/1991 | Wilson | 310/90.5 |
| 5,072,181 | 12/1991 | Burger | 324/207.25 |
| 5,083,084 | 1/1992 | Bauer et al. | 324/207.19 |
| 5,140,858 | 8/1992 | Nishimoto et al. | 73/587 |
| 5,198,763 | 3/1993 | Konishi | 324/207 |
| 5,214,378 | 5/1993 | Hore | 324/207.23 |
| 5,245,160 | 9/1993 | Quabeck et al. | 219/471 |
| 5,248,940 | 9/1993 | Patience et al. | 324/207 |
| 5,277,543 | 1/1994 | Noguchi et al. | 415/118 |
| 5,300,841 | 4/1994 | Preston et al. | 310/90.5 |
| 5,302,894 | 4/1994 | Hrubes | 324/207.16 |
| 5,315,244 | 5/1994 | Griebeler | 324/207.21 |
| 5,319,270 | 6/1994 | Tanaka et al. | 310/67 |
| 5,325,005 | 6/1994 | Denk | 310/68 |
| 5,336,996 | 8/1994 | Rusnak | 324/207 |
| 5,355,041 | 10/1994 | Shirao et al. | 324/207.16 X |
| 5,363,033 | 11/1994 | Suda et al. | 324/207.15 |
| 5,406,155 | 4/1995 | Persson | 310/68 |
| 5,430,372 | 7/1995 | Hecht | 324/207 |
| 5,448,924 | 9/1995 | Nagai et al. | 73/865.9 |
| 5,696,444 | 12/1997 | Kipp et al. | 324/207.32 |

FOREIGN PATENT DOCUMENTS

| | | | |
|---|---|---|---|
| 0 759 545 A1 | 2/1997 | European Pat. Off. . | |
| 0 828 152 A2 | 3/1998 | European Pat. Off. . | |
| 44 41 828 A1 | 11/1994 | Germany | G01M 13/04 |
| 4-42016 | 6/1990 | Japan . | |
| 5-30716 | 2/1993 | Japan | 17/30 |
| 08236483 | 3/1998 | Japan . | |
| 1 480 848 | 7/1977 | United Kingdom | 13/4 |
| 2 105 475 | 3/1983 | United Kingdom . | |
| 2221306 | 1/1990 | United Kingdom . | |
| 2 260 821 | 4/1993 | United Kingdom . | |
| 89/12528 | 12/1989 | WIPO . | |

OTHER PUBLICATIONS

Herceg, Edward E.; "*Handbook of Measurement and Control*"; Revised Edition; Schaevitz Engineering, no date.

NERAC Listing—Patents Related: (Inductively) Sensing Movement in Rotating Equipment using Multiple Internal Sensors, pre–'94.

Graf. Rudolf F.; "*Modern Dictionary of Electronics*"; Howard W. Sams & Co., Inc.; p. 193, no date.

Product Brochure "Protect your Pumps from Dry Running" created in Jul. 1996 for Ansimag Inc. of Elk Grove Village, Illinois.

DRY–KUT Instruction Manual for "Monitors to Protect Your Pumps from Dry–Running and Overloading" created in 1996 for Ansimag, Inc. of Elk Grove Village, Illinois.

Sundstrand Fluid Handling Brochure entitled "Sundyne Vertical Integrated Pump", Bulletin 11.1, dated Feb., 1992.

Sundstrand Fluid Handling Brochure entitled "Sundyne Canned Motor Pumps", Bulletin 1.4, dated Aug., 1995.

Drawing labeled "Figure 1–3 NC Series Chempumps" (date unknown).

Drawing labeled "Fig. A".

Product Brochure "When Safety and Product Integrity Cannot be Compromised" HMD Seal/Less Pumps, HMD Seal/Less Pumps Ltd. 1996.

Ser. No. 08/206,461 Kipp et al., date unknown.

"Equipment News" Section, *Canned Motor Pumps Approved for Explosion–Proof Duty,* World Pumps, Oct. 1996, p. 12.

1 Page (No. 163) from Oct. 1992 Chemical Engineering Magazine advertising Teikoku Canned Motor Pump.

1 Article from May 25, 1994 issue of Design News entitled "*Switch Senses All Metals At Equal Distances*".

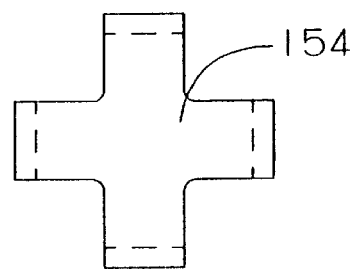
FIG.4A
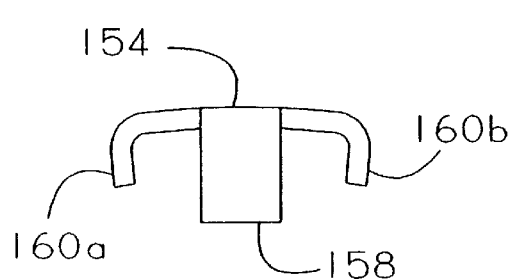
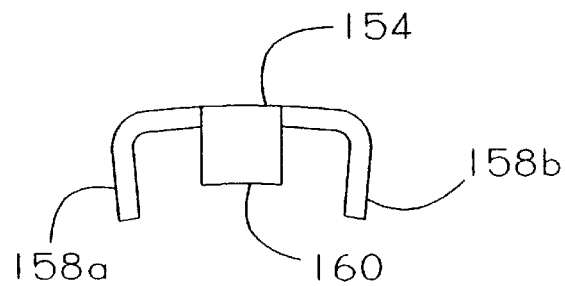
FIG.4C      FIG.4B

5,955,880

SEALLESS PUMP ROTOR POSITION AND BEARING MONITOR

FIELD OF THE INVENTION

The instant invention relates generally to rotor position and bearing wear monitors, and more particularly to rotor position and bearing wear monitors utilizing inductive coil sensors capable of detecting axial and radial bearing wear for sealless motor pumps.

BACKGROUND ART

Process industries today are faced with increasingly stringent environmental regulations with regard to fluid leakage and containment of process fluids. At the same time, demands for increased productivity require higher reliability equipment to minimize down time. In an effort to meet both of these challenges, many in the process industry have moved from a conventional centrifugal motor/pump configuration to sealless motor/pumps. This movement is precipitated in part due to the problem of wear of the mechanical seals required by the conventional centrifugal motor/pumps. This seal wear may result in increased leakage rates of the process fluid or massive failure.

A canned motor/pump assures total fluid containment by eliminating any moving part extending through the primary containment or can, therefore eliminating the seal wear/leakage problem of the conventional centrifugal motor/pumps. The canned motor/pump, as its name implies, comprises a sealed housing (primary containment) or can into which is placed the rotor portion of the drive motor. The rotor shaft is coupled to and drives the pump impeller at the pump end of the machine. The can is open to the pump end of the machine, and hence process fluid is allowed to circulate through the can and around the rotor. The rotor is supported within this can by its shaft on radial journal and axial thrust bearings which are lubricated by the circulating process fluid within the can.

While sealless pumps solve the seal wear/leakage problems of conventional motor/pumps, they are susceptible to catastrophic failure. This catastrophic failure is most often the result of excessive bearing wear, dry run, or high vibration. As stated above, a typical sealless or canned motor pump has its motor rotor supported on radial journal and axial thrust bearings lubricated with process fluid. These bearings are made of a relatively soft carbon or wear resistant ceramic material. Lubrication is marginal for most operating conditions due to the nature of the process fluid and flow paths within the can. Two key factors that impact carbon bearings wear are abrasives in the fluid and intermittent dry operation. If the bearings wear beyond a prescribed limit, contact can occur between the rotor and stator causing severe damage to the pump. On the other hand, motors with ceramics bearings can fail due to dry operation which results in thermal shock and sudden failure of the brittle bearing material. Excessive shaft vibration due to rotor imbalance or bearing instability can also result in accelerated bearing wear. Incorrect direction of rotation results in reduced pump performance and potential bearing failure due to lack of cooling or lubricating fluid flow.

Since the bearings in a canned motor pump are contained within the sealed can, visual inspection for excessive wear is impossible without shutting down the pump and dismantling the machine. An external mechanical bearing wear monitoring device, such as shown in U.S. Pat. No. 3,991, 701, entitled Bearing Wear Detecting Device for Canned Motor Driven Pumps, issued to Sato, has been used to warn of impending failure in a canned motor pump. This device, however, detects only when the bearings have worn approximately two-thirds of the allowable wear. The wear detector of the Sato '701 patent does not indicate progressive wear or, which bearing is being worn. Indication of wear of the bearing on the shaft end opposite the bearing wear monitor is not always reliable. It also cannot indicate dry run operation excessive vibration or reverse rotation which are also causes of bearing failure. Additionally, once this type of device activates, it must be replaced. These features are no longer acceptable to customers in the industry.

In recognition of the problems and dissatisfaction associated with such devices, electronic bearing monitoring devices which allow the detection and indication of progressive bearing wear began to be utilized by canned pump manufacturers. One such device is shown in British Patent No. 1,480,848 issued to Considine, for Improvements in or Relating to Bearing Wear Detection Devices, on Oct. 8, 1973. The Considine '848 device utilizes a single electronic coil positioned completely around a bobbin which is drivably coupled to the motor shaft of a canned motor pump. The bobbin is mounted within an outer housing which is mounted on the end of the housing for the canned motor pump. The bobbin contains permanent magnets, and any eccentricity in rotation will induce an emf in the coil. This emf signal is passed through an aperture in the can, which is filled with encapsulating resin after final assembly, to a detection circuit.

While this device allows for detection of progressive bearing wear, it does so only for bearing wear in a radial direction on one end. Disadvantageously, axial bearing wear is not detected by the eccentric rotation of the bobbin. Additionally, the addition of an outer housing on the end of the canned motor pump is disadvantageous. The end where the bobbin is to be mounted is normally closed as part of the containment can for the motor pump. The addition of the outer housing requires the addition of a gasket to seal the junction between the containment can and the outer housing. This introduces one more point of possible leakage for the sealless motor pump. Additionally, in many processing plant operations, the installation envelope of a canned motor pump is limited, and the addition of the bobbin's outer housing increases the overall length of the machine.

One manufacturer of canned motor pumps, Teikoku U.S.A., Inc., also utilizes electronic monitoring devices known as the Teikoku Rotary Guardian (TRG). One aspect of the TRG Monitor is disclosed by U.S. Pat. No. 4,211,973, for an Apparatus for Detecting Faults to be Occurred or Initially Existing in a Running Electric Rotary Machine, issued to Sato et al., on Jul. 8, 1980. This electronic monitoring device detects eccentric rotation of the rotor due to radial bearing wear. It comprises two coils specially located within the stator slots of the main stator and coupled in series. Energization of the main stator windings provides the magnetic flux which is utilized by the detector windings. The coils are coupled in series to cancel the fundamental component of the stator energization and to allow detection of eccentric rotation. Unfortunately, this detection circuitry cannot detect bearing wear in a thrust or axial direction. Additionally, it cannot be used with a conventional canned motor pump configuration, but requires that the fundamental structure of the motor must be adapted to allow cooperation with the detector coils. This greatly limits its ability to be added as a retrofit to existing canned motor pumps already in operation in the process industry.

The other patent referenced by advertisements for TRG is U.S. Pat. No. 4,334,189, for Operation Supervisory Apparatus, issued to Sato, on Jun. 8, 1982. This patent discloses a similar bearing wear detector utilizing two coils interposed in the stator slots as disclosed in the Sato et al. '973 patent. In addition to the bearing wear monitor, this reference additionally adds a direction of rotation monitor of conventional design, and a combining circuit to output the larger of the two monitor's outputs. As with the '973 reference, however, the bearing monitor only monitors wear in a radial direction. No monitoring is provided for bearing wear in an axial or thrust direction. Additionally, the ability to easily retrofit existing canned motor pumps to incorporate these detectors is greatly reduced due to the location of the monitor coils (within the stator slots), and due to the requirement of a specific rotor/stator structure to allow cooperation of the detector coils.

In recognition of the deficiencies of the foregoing references in failing to provide indication of bearing wear in both an axial and a radial direction, bearing monitors which were capable of detecting both directions of wear were developed. One such bearing wear monitor is disclosed in U.S. Pat. No. 5,189,763, issued to Konishi, for an Apparatus for Monitoring the Axial and Radial Wear on a Bearing of a Rotary Shaft, on Mar. 30, 1993. This monitoring device utilizes a single contactless distance sensor and an axial groove or ridge and a helicial groove or ridge. Alternatively, Konishi '763 discloses that other devices such as a light source and a photo sensor may be used in a similar manner. The grooves or ridges are formed on a rotor shaft end nut, and the distance sensor is placed in close proximity to the end nut, within the containment can. While this device provides both axial and radial bearing wear indication, it still requires that the containment can be penetrated by a probe containing the distance sensor and electrical leads. While this probe is not in motion, sealing and potential leaks are still a problem.

It is a primary objective of the instant invention, therefore, to solve the aforementioned problems by providing accurate and continuous monitoring of progressive radial and axial rotor position and progressive bearing wear when the shaft is moving eccentrically or concentrically, measurement of excessive rotor vibration, and detection of incorrect direction of rotation without penetrating the containment can of a canned motor pump, and without requiring a change in the fundamental structure of the rotor and stator of a canned motor pump. It is also an objective of the instant invention to provide data on demand for the purpose of diagnostic or trend analysis to aid users in the process industry in planning maintenance activity.

It is a further objective of the instant invention to sense and display the progressive axial bearing wear in both directions along the axis of rotation. It is an added objective to indicate in which of these two directions axial wear is actually occurring. It is a still further objective of the instant invention to sense and display progressive radial bearing wear for each end of the rotor shaft. It is a further objective of the instant invention to provide a non-invasive means to sense both progressive bearing wear in both directions of axial wear and radial wear on both ends of the rotor shaft simultaneously. It is additionally an objective of the instant invention to provide a means for sensing this type of bearing wear which is easily retrofitable on existing motor pumps currently being utilized in the process industry. It is also an objective of the instant invention to provide an effective means of sensing this bearing wear in an extremely electromagnetically noisy environment. It is also an objective of the instant invention to provide a sensor means that is low cost to manufacture.

SUMMARY OF THE INVENTION

The instant invention provides a bearing wear monitor for use with a sealless motor pump having a wound stator and a rotor drivably coupled to an impeller. The rotor of this sealless motor pump is typically mounted on radial journal bearings and axial thrust bearings within a containment can. This rotor as well as the bearings are exposed to the process fluid which is being pumped by the sealless motor pump. The wound stator, on the other hand, is mounted external to the containment can and isolated from the process fluid. A preferred embodiment of this bearing wear monitor comprises a target which is embedded in an outer periphery of the rotor in axial proximity to a first end of the rotor. This target is magnetic, and preferably has a different magnetic permeability than the adjacent rotor material, such as for example aluminum end rings. The monitor further comprises a first and a second sensor mounted external to the containment can. These two sensors are positioned in axial proximity to the target, and are radially displaced approximately equally around the periphery of the containment can. The instant invention further includes a magnetic field generating means, such as a coil energized by a high frequency source, operatively coupled to the two sensors. The magnetic field generators produce a first and a second local magnetic field, each being coupled through the containment can, process fluid, rotor, and at least a portion of the target to each of the sensors. The sensors, in turn, each generate an output signal in response to its respective magnetic field. A monitor circuit is also included in the instant invention. This circuit is coupled to each of the sensors, and compares their output signals. The monitor circuit generates a scaled output in response to a difference between these two signals which is approximately linearly related to bearing wear in a radial direction on the first end of the rotor.

To monitor the bearing wear on the other end of the rotor, the instant invention includes a second target embedded in an outer periphery of the rotor in axial proximity to the second end of the rotor. As with the first target, this second target is magnetic, and preferably has a different magnetic permeability than the adjacent rotor material, such as for example the aluminum end rings. A third and a fourth sensor are then mounted external to the containment can and positioned in axial proximity to this target, and are radially displaced approximately equally around the periphery of the containment can. On this second end, the instant invention includes a magnetic field generating means, such as a coil energized by a high frequency source, operatively coupled to the two sensors. The magnetic field generators each produce a local magnetic field which is coupled through the containment can, process fluid, rotor, and at least a portion of the target to each of these sensors. The sensors, in turn, each generate an output signal in response to its respective magnetic field. The monitor circuit is also coupled to each of these sensors, and compares their output signals. The monitor circuit generates a scaled output in response to a difference between these two signals which is approximately linearly related to bearing wear in a radial direction on the second end of the rotor. Additional sensors may be added orthogonal to the other sets, and in a like manner monitor radial bearing wear along a second axis.

Bearing wear in an axial direction may also be monitored by the instant invention. This is accomplished by comparing the sensor output from sensors in two different axial planes. Additional sensors may be added to accomplish this function, or the outputs from the existing sensors may be combined and differentially compared to determine the axial bearing wear. In a preferred embodiment, two sensors are mounted external to the containment can in an axial plane displaced from the first and second sensors described above.

The two new sensors are radially displaced approximately equally around the periphery of the containment can, and radially aligned with the first and second sensors. The magnetic field generators are also operably coupled to these two new sensors for generating a two new local magnetic fields. The two new sensors each generate an output signal in response to the magnetic fields as described above. The monitor circuit is also coupled to these sensors, and differentially combines their output signals to form a first axial output signal (indicating radial displacement with axial sensitivity in a first axial plane). The monitor circuit further differentially combines the output signal from the first sensor with the output signal from the second sensor to form a second axial output signal (indicating radial displacement with axial sensitivity in a second axial plane). The monitor circuit generates a scaled output in response to a difference between the first and second axial output signals which is approximately linearly related to bearing wear in an axial direction.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

FIG. 4a is a top view of a pole piece utilized in an embodiment of the instant invention with the bearing wear monitor sensors;

FIG. 4b is a front view of a pole piece utilized in an embodiment of the instant invention with the bearing wear monitor sensors, FIG. 4c is a side view of a pole piece utilized in an embodiment of the instant invention with the bearing wear monitor sensors;

FIG. 7 is a single line interconnect sensor wiring diagram of the embodiment of the instant invention illustrated in FIG. 6a;

DESCRIPTION OF THE PREFERRED EMBODIMENTS

Figure 1:
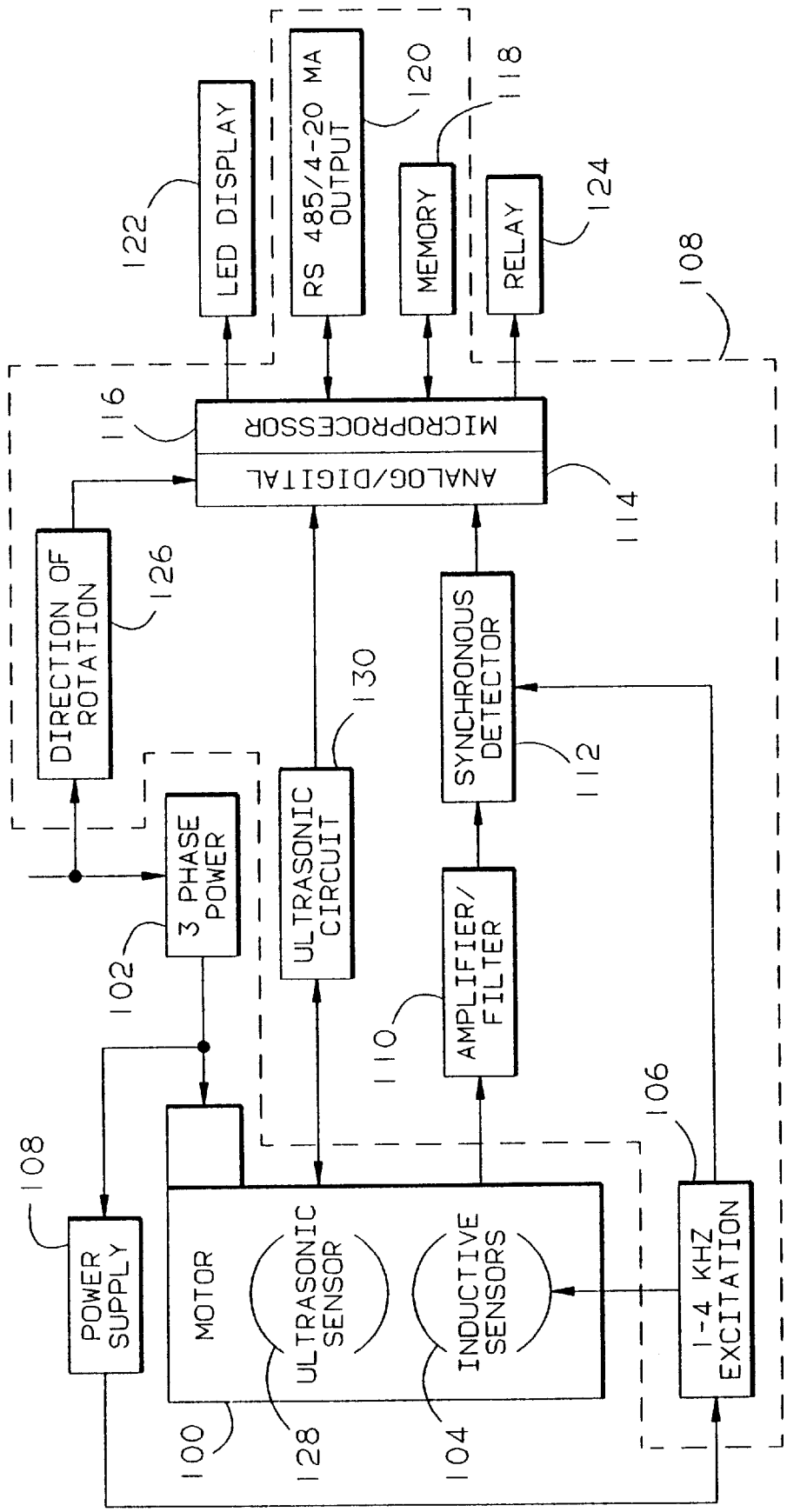
FIG. 1 is a simplified block diagram of the bearing wear monitor system of the instant invention.

As illustrated in the simplified block diagram of FIG. 1, inductive sensors 104 are provided on the motor 100 which is powered by a power supply, preferably a three phase power supply 102, to sense internal bearing wear. The inductive sensors 104 are excited at a frequency sufficiently high enough to avoid interference from the motor excitation frequency. In a preferred embodiment, the excitation circuitry 106 excites at a frequency in the range of 1 kHz to 4 kHz. This circuitry 106 is powered from a power supply 108 which may be internal to the motor 100 or the controller 108. The output of the inductive sensors 104 is input through an amplifier/filter 110 to a synchronous detector 112. The synchronous detector 112 is also fed the excitation frequency from the excitation circuitry 106. The output of the synchronous detector 112 is output to an analog to digital converter 114 which outputs the converted signal to the microprocessor 116 for processing. The controller 108 includes memory circuitry 118 and a communications interface as illustrated by the RS 485 circuitry 120, although other communication means may be used as appropriate or desired. The controller 108 outputs information to a display 122 for maintenance or other personnel to observe, and controls a relay 124 which may, for example, de-energize the motor 100 in the event of a sensed failure.

In a preferred embodiment of the instant invention, the direction of rotation is also monitored by circuitry 126 known in the art which monitors the three phase power which drives the motor. This monitored direction of rotation is also fed to the microprocessor 116 which outputs the information to the display 122. Additionally, at least one ultrasonic sensor 128 coupled through an ultrasonic circuit 130 to the microprocessor 116 may be provided to detect dry bearing operation of the motor.

Figure 2:
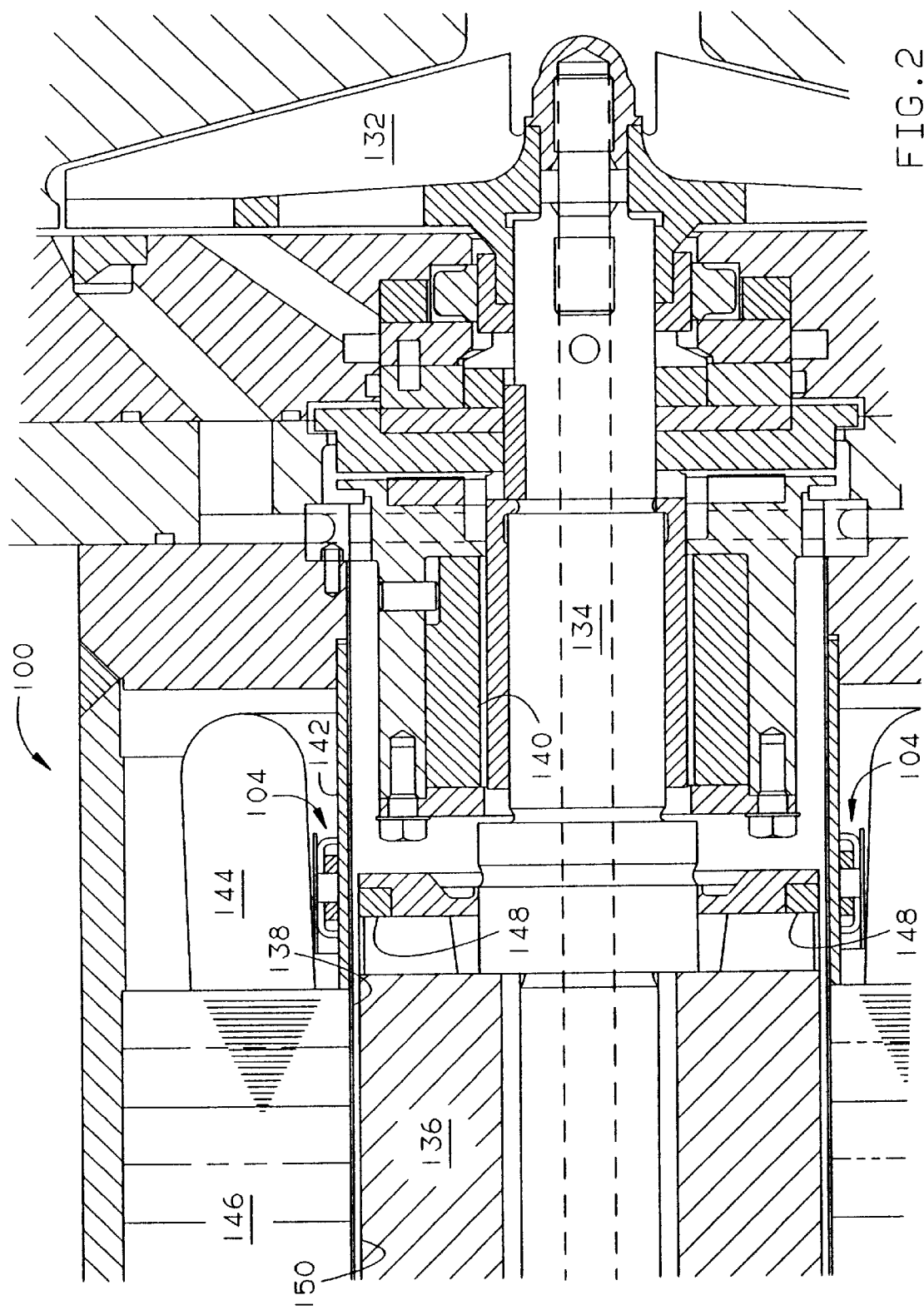
FIG. 2 is a cross sectional illustration of a sealless motor pump, specifically a sealless canned motor pump, constructed in accordance with an embodiment of the instant invention.

A detailed partial cross section of the motor 100 of FIG. 1 is illustrated in FIG. 2. More particularly, FIG. 2 illustrates a detailed partial cross section of a specific application of the instant invention in a canned motor pump as described above. As may be seen, the pump impeller 132 is driven by shaft 134 by rotor 136. The rotor is enclosed by a stator can 138 which provides a fluid seal for the process fluid which is being pumped by the impeller 132 and which lubricates and cools the rotor 136 and its bearings 140. The stator can 138 is preferably made from a non-magnetic material with a relative high volume resistivity. The stator can 138 is surrounded by a non-magnetic back-up sleeve 142 which provides additional strength for the stator can 138 to resist internal pressure. In this way, the windings 144 of the stator 146 are separated from the process fluid.

In a preferred embodiment of the instant invention, the bearing wear inductive sensors 104 are located near either end of the canned motor stator 146 beneath the stator windings 144 to facilitate interchangeability with existing stators and rotors. The sensors 104 are attached to the back-up sleeve 142 equidistant around the outer periphery along an axial axis to avoid any circumferential stress imposed by deformation of the stator can 138 when exposed to internal fluid pressure. The ends of the sensors 104 project through the back-up sleeve 142 and may be swaged or otherwise upset to increase the pole cross sectional area for increased signal strength. A rotor target 148 is located on either end of the motor rotor 136. The rotor target 148 is preferably of magnetic material such as soft iron. Preferably, the rotor target is of a different magnetic permeability than the surrounding material. Note that the sensor 104 centerline is offset from the target 148 axis in this preferred embodiment by a specified amount, typically one half the axial thickness of the target 148. The target 148 is separated from the process fluid by a thin, non-magnetic rotor can 150 with relatively high volume resistivity.

Figure 3:
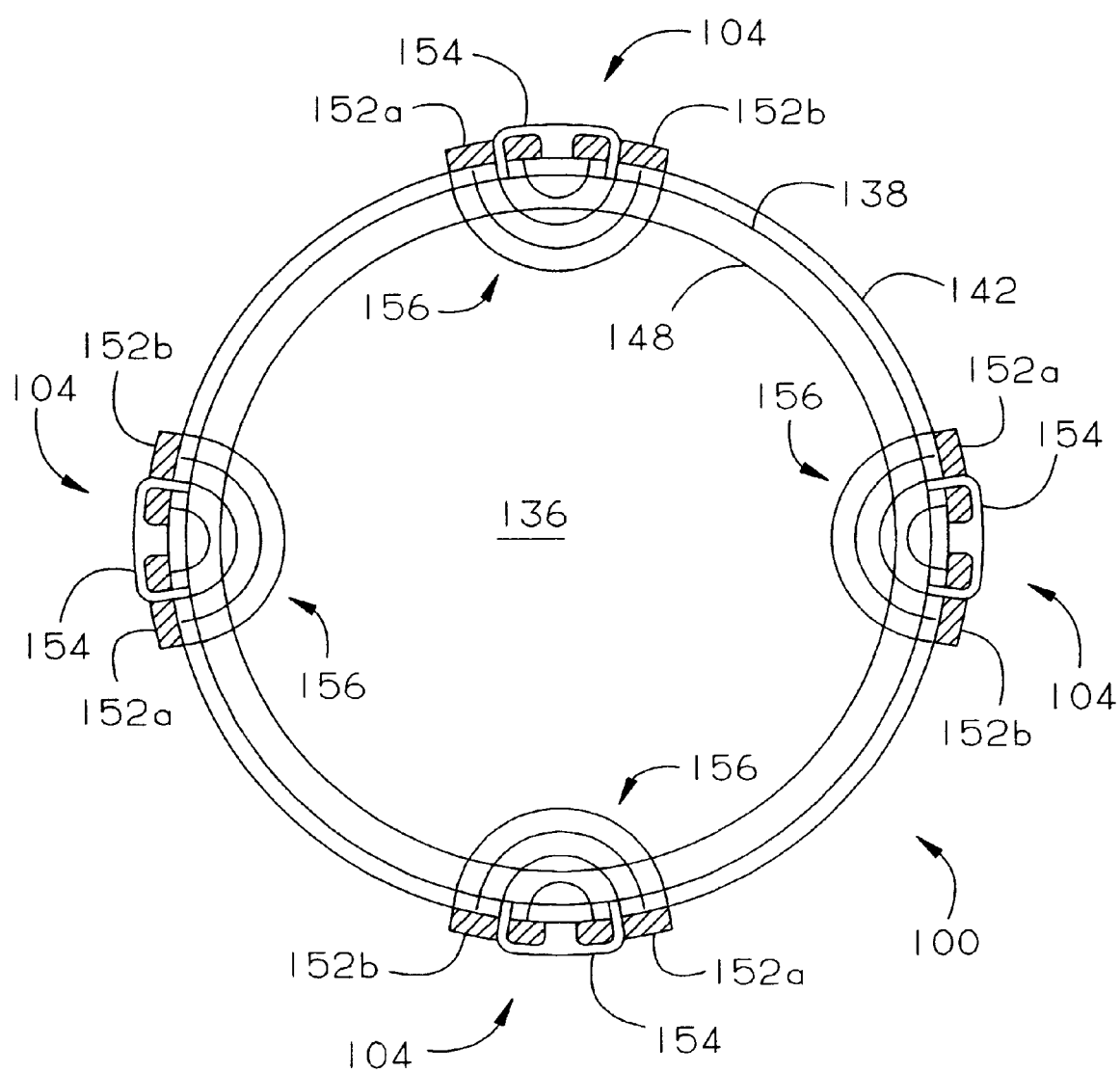
FIG. 3 is a simplified end view of the canned motor pump of FIG. 2 illustrating the placement of bearing wear monitor sensors and their generation of local magnetic fields.

FIG. 3 is an end view cross section of the motor 100 illustrating the equidistant placement of the bearing sensors 104. Each sensor 104 comprises a set of dual coil sub-assemblies. Each coil sub-assembly 152a and 152b is wound with a suitable number of turns with two or three separate wires, forming two or three individual windings per pole (the exact number of windings being dependant on the specific configuration as described below). The dual coil assemblies 152a, 152b are mounted on the pole pieces 154. Detail of the pole pieces 154 is shown in FIGS. 4A, 4B, and 4C and described below. Each of the sensors 104 generate a local magnetic field 156 when excited by the excitation circuit 106 of FIG. 1. Each of the local magnetic fields 156 are coupled through the containment can 138, process fluid, rotor 136, and the target 148 to each of the other sensor coil assemblies 152a, 152b. As the rotor 136 changes position, either due to vibration or bearing wear, the reluctance of the magnetic path 156 associated with each of the four sensors 104 changes. When one of the targets 148 moves toward or away from a given sensor 104 as the result of radial displacement, the reluctance of that sensor's magnetic path increases or decreases in response. Likewise, when one of the targets 148 moves towards or away from the four sensors 104 located on one end of the rotor 136 as a result of axial displacement, the reluctance of those sensor's magnetic paths increase or decrease in response. The reluctance of the magnetic path 156 associated with a sensor 104 determines the inductance of its dual coil assembly windings 152a, 152b and this inductance in turn determines the voltage induced in the windings when the coils are excited by a high frequency signal. Comparing the voltages induced in windings 152a, 152b located on opposite ends of the rotor 136 along a diameter provides an indication of radial displacements of the rotor 136. Similarly, comparing voltages induced in windings located in two different axial planes provides an indication of axial displacement of the rotor 136. Both of these comparisons and the synchronous detection which allows for them are discussed more fully below with regard to FIG. 7 et seq.

Figure 5:
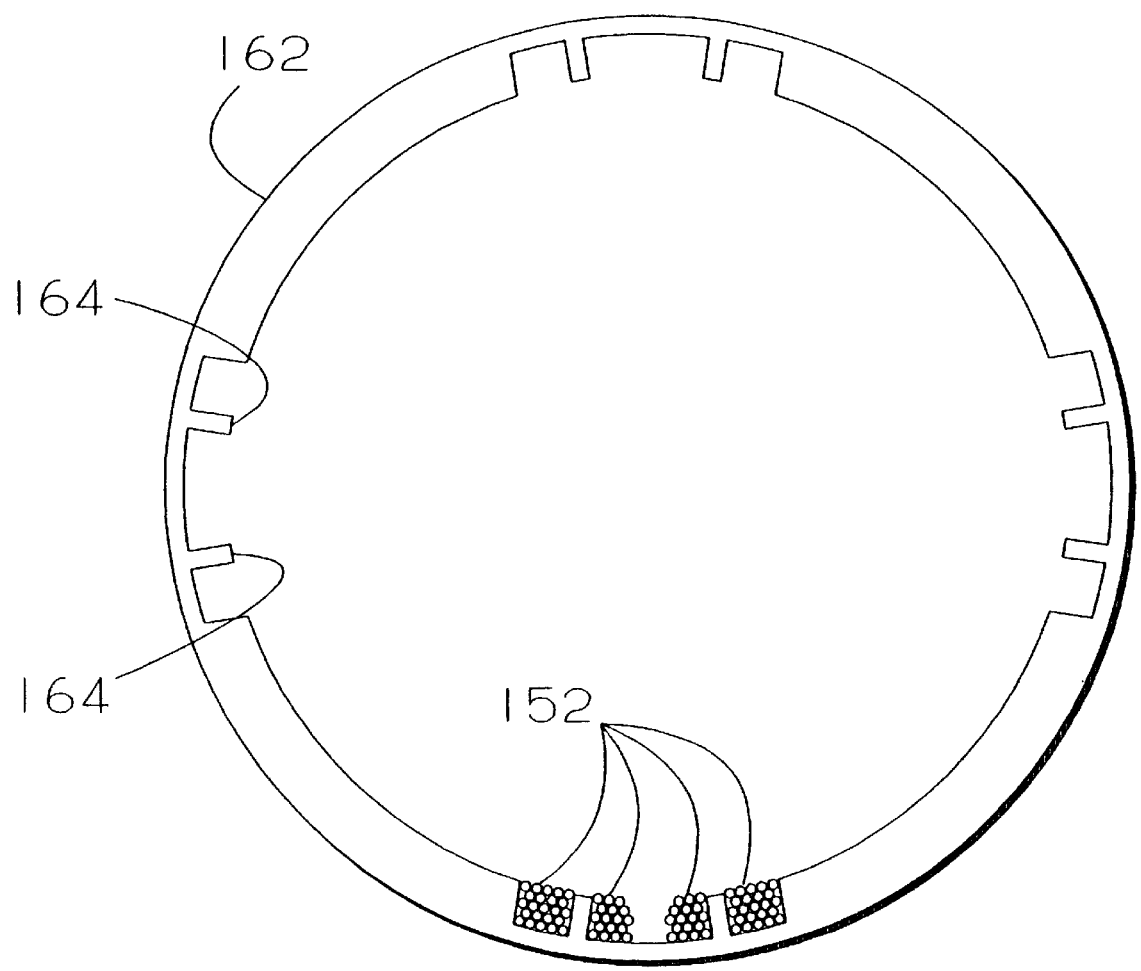
FIG. 5 illustrates a coil mounting ring which is an alternated embodiment of the mounting pole piece of FIG. 4.

The pole pieces 154 for the sensors are shown in greater detail in FIGS. 4A, 4B, and 4C. As may be observed, the pole pieces preferably have two longer legs 158a, 158b which form the poles for the coil sub-assemblies (not shown). The pole pieces also have two shorter legs 160a, 160b which are used to mount the sensors on the back-up sleeve. An alternate coil mounting means is shown in FIG. 5. This coil mounting ring 162 may be made from solid material or laminated electrical steel. The four sets of dual coils 152 are located on pole salients 164 as shown. The mounting ring 162 is attached to the back-up sleeve in the same relative position as the aforementioned pole pieces 154.

Figure 6A:
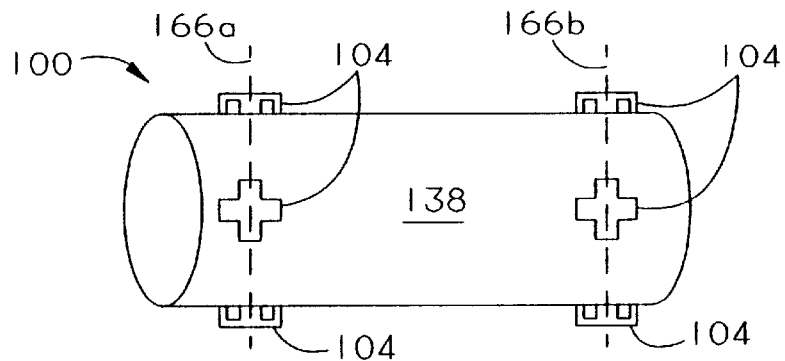
FIG. 6a is external view simplified block diagram of the bearing wear monitor sensor placement of an embodiment of the instant invention.
Figure 6B:
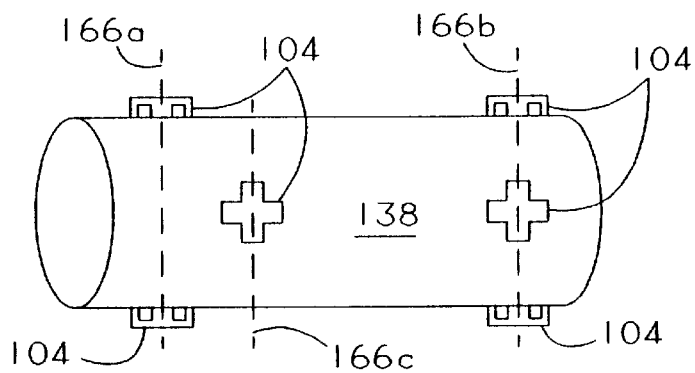
FIG. 6b is external view simplified block diagram of the bearing wear monitor sensor placement of an alternate embodiment of the instant invention.

FIGS. 6A, 6B, 6C, and 6D illustrate exemplary sensor mounting configurations of the instant invention. In FIG. 6A, four sensors 104 are mounted equidistant about the outer periphery of the containment can 138 at either end of the motor 100. Each of the four sensors 104 on each end of the motor 100 are located in the same axial plane 166a and 166b. For this configuration, the sensing of radial displacements for a particular end of the motor 100 utilizes the sensors 104 located in one axial plane 166a for that end. The sensors are paired with the sensor on the opposite sides of the motor along a diameter and are connected in series opposing one another. If the voltages induced by the local magnetic field in the radial winding of these sensors 104 are equal, no net output then results because the voltage from one coil exactly cancels the voltage from the opposite coil.

A radial displacement of the rotor upsets this balance, causing the voltage induced in one coil to increase, while the voltage induced in the other coil decreases. The resulting imbalance produces a net signal whose amplitude depends upon the amount of the displacement and whose phase depends upon the direction of displacement. The dependence of net output voltage upon radial displacement is approximately linear.

Figure 7:
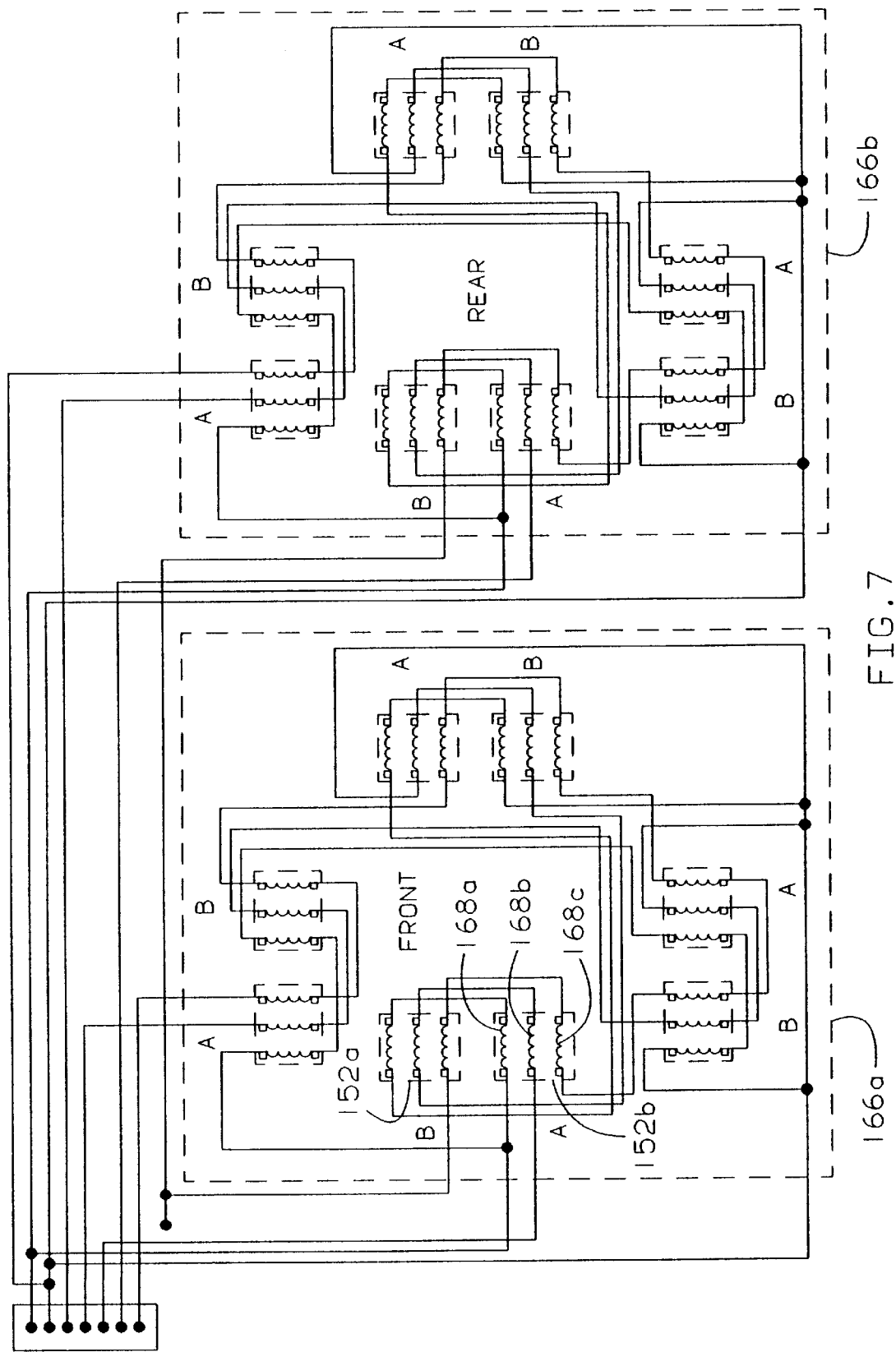

For sensing axial displacements with the configuration of FIG. 6a, the four axial sense coils of sensors 104 located at one end of the rotor in axial plane 166a are connected in series aiding one another. The four axial sense coils of sensors 104 located at the opposite end of the rotor in axial plane 166b are likewise connected in series aiding one another. Finally, the four coils on one end and the four coils on the opposite end are connected in series opposing one another. If the rotor is located symmetrically with respect to the coils in two different axial planes 166a, 166b, the voltage induced in these coils are equal and they cancel producing no net output. An axial displacement upsets this cancellation, producing a net signal whose amplitude depends upon the amount of the displacement and whose phase depends upon the direction of the displacement. Since an axial displacement effects the voltage induced in all four coils at each end of the rotor (in each axial plane 166a, 166b), it also effects the radial sensitivity. The coils at the end towards which the rotor is displaced become more sensitive to radial displacements while the coils located at the opposite end become less sensitive to radial displacements. This phenomena is easily corrected by the associated microprocessor which has at its disposal both the radial and the axial output signals. The axial output signal is used by the microprocessor to sense the axial displacement and apply it as a scaling factor to the radial output signals. A schematic representation of this axial and radial sensor configuration is illustrated in FIG. 7. Each coil sub-assembly 152 consists of three windings 168a, 168b, 168c. One winding 168a of each coil is used for excitation and one each for radial 168b and axial 168c sensing. By interconnecting the coils from either end of the motor 100 according to FIG. 7, the sensors provide both axial position and radial position of the rotor (not shown).

Figure 8:
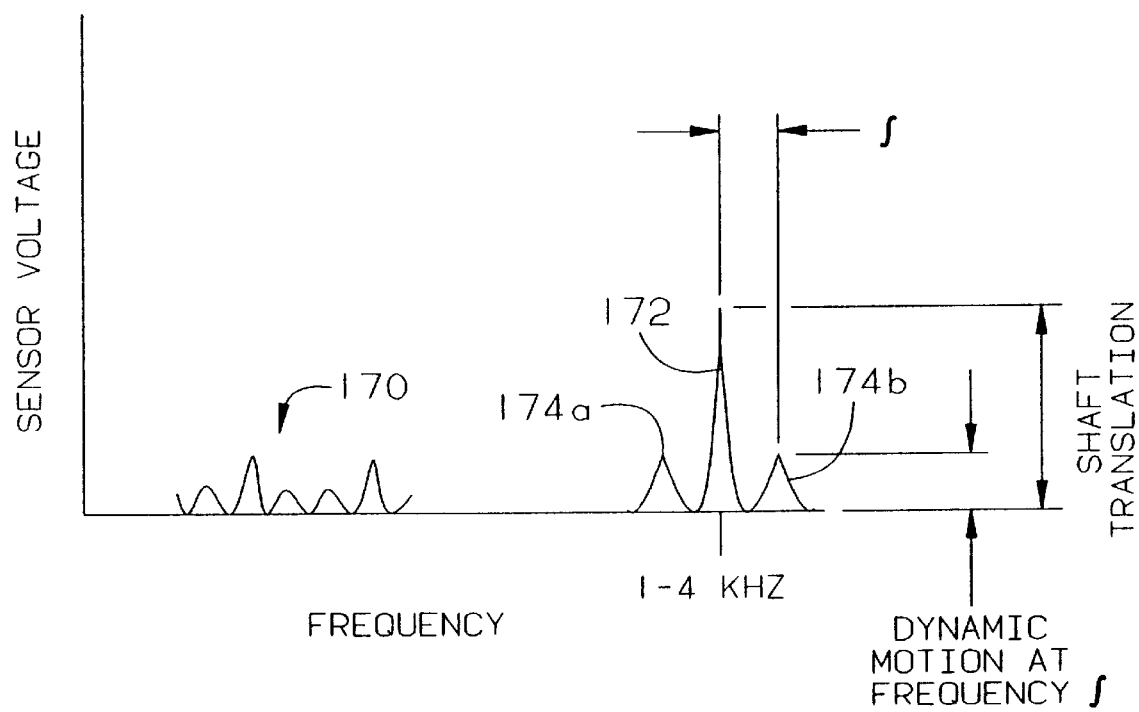
FIG. 8 is a graphical representation of the output frequency spectrum of the bearing wear monitor sensors of the instant invention.
Figure 9A:
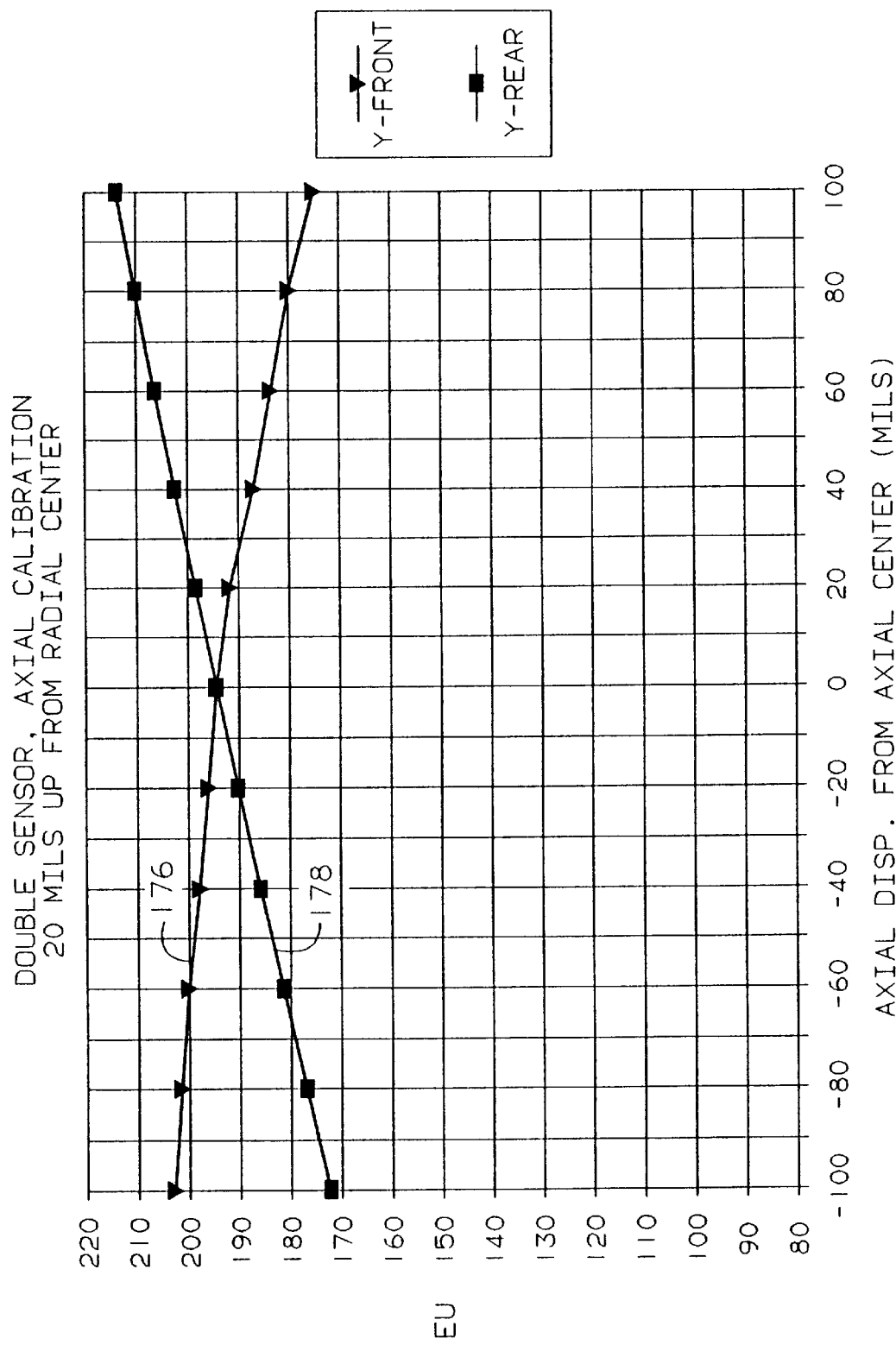
FIG. 9a is a graphical illustration of the bearing wear monitor sensor outputs from the radial sensors utilized to calculate axial displacement with a radial displacement of 20 mils up from radial center of the embodiment of FIG. 6d.
Figure 9B:
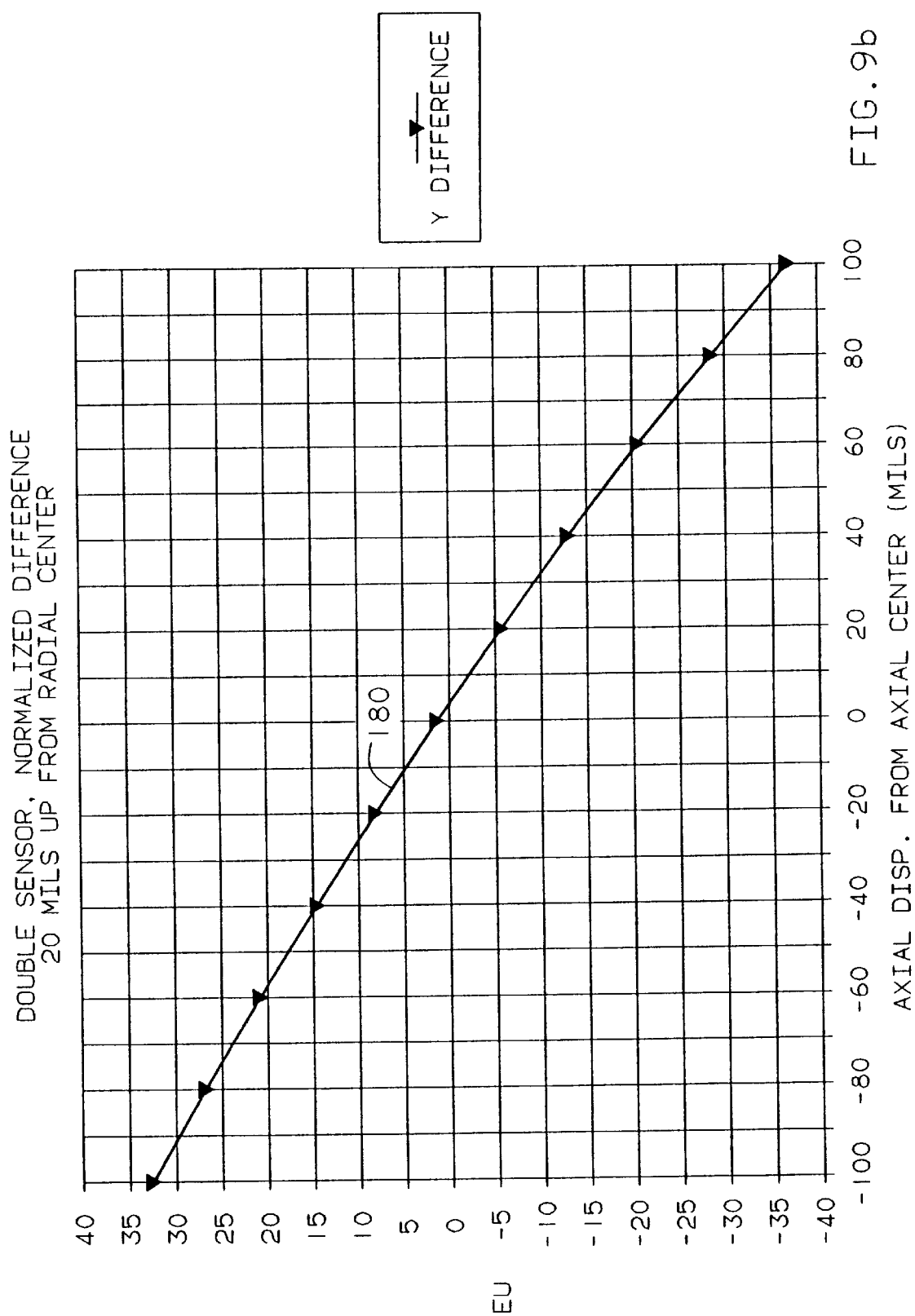
FIG. 9b is a graphical illustration of the combined bearing wear monitor sensor outputs from the radial sensors of FIG. 9a indicating axial displacement with a radial displacement of 20 mils up from radial center.
Figure 10A:
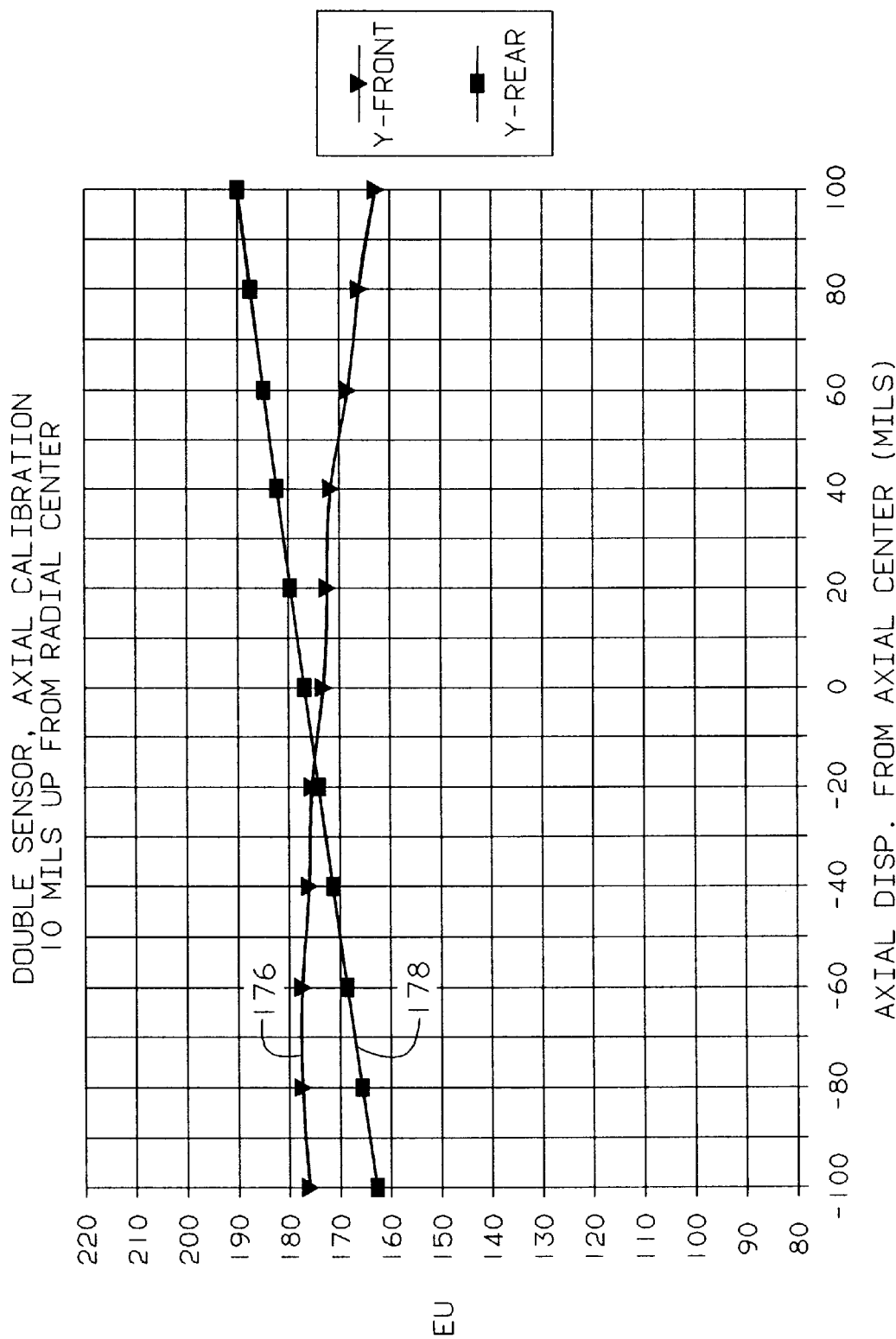
FIG. 10a is a graphical illustration of the bearing wear monitor sensor outputs from the radial sensors utilized to calculate axial displacement with a radial displacement of 10 mils up from radial center of the embodiment of FIG. 6d.
Figure 10B:
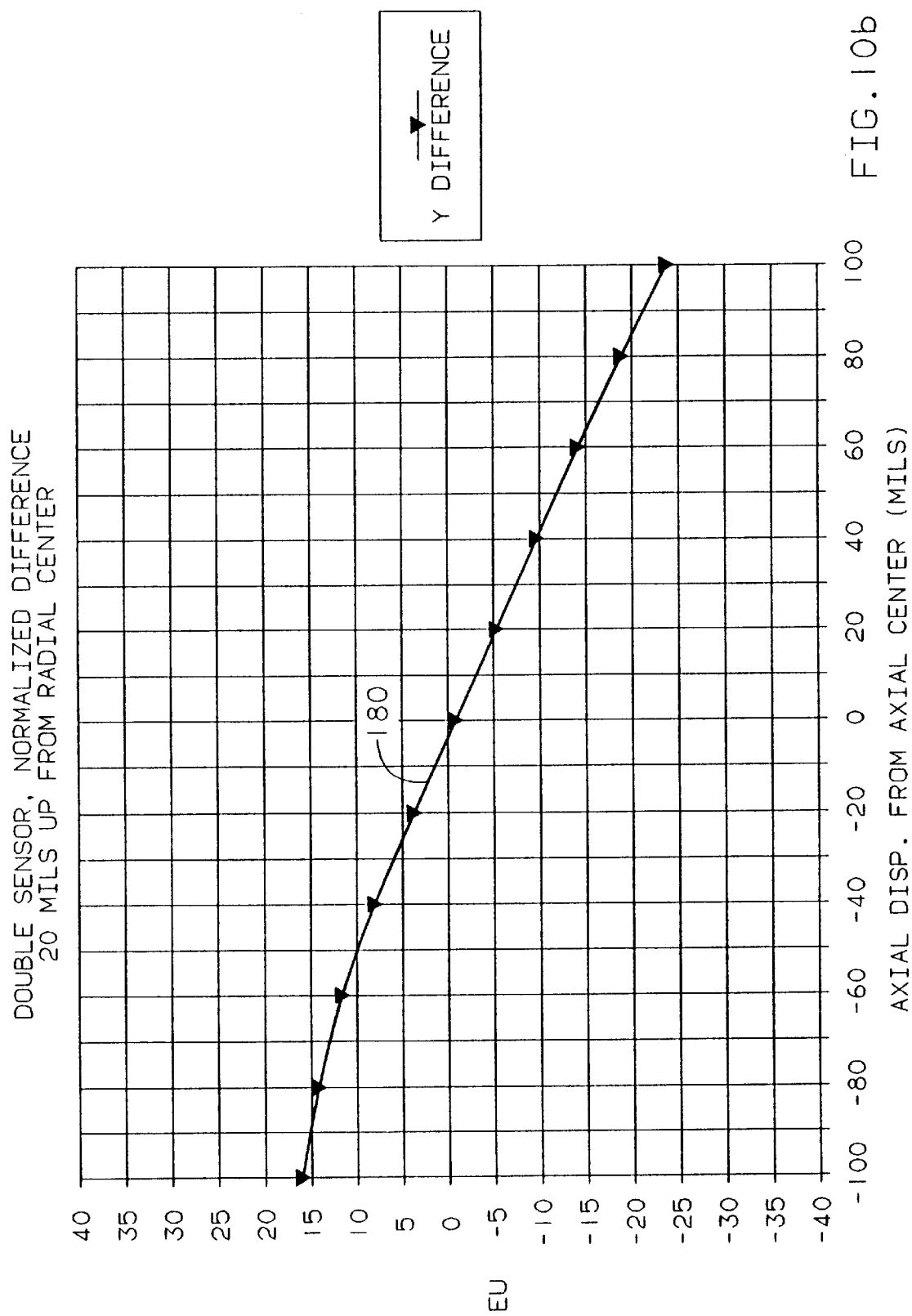
FIG. 10b is a graphical illustration of the combined bearing wear monitor sensor outputs from the radial sensors of FIG. 10a indicating axial displacement with a radial displacement of 10 mils up from radial center.
Figure 11A:
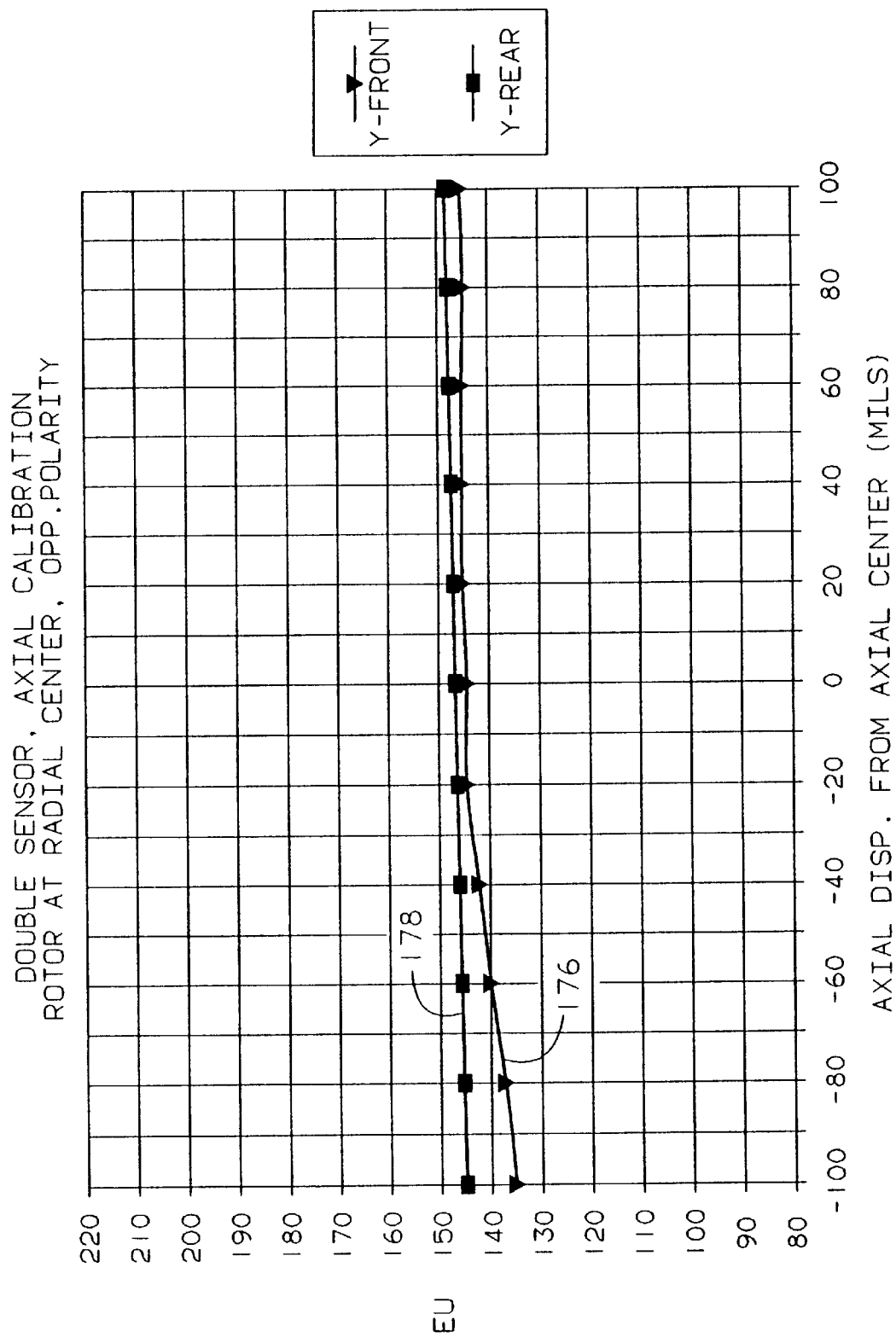
FIG. 11a is a graphical illustration of the bearing wear monitor sensor outputs from the radial sensors utilized to calculate axial displacement with no radial displacement from radial center of the embodiment of FIG. 6d.
Figure 11B:
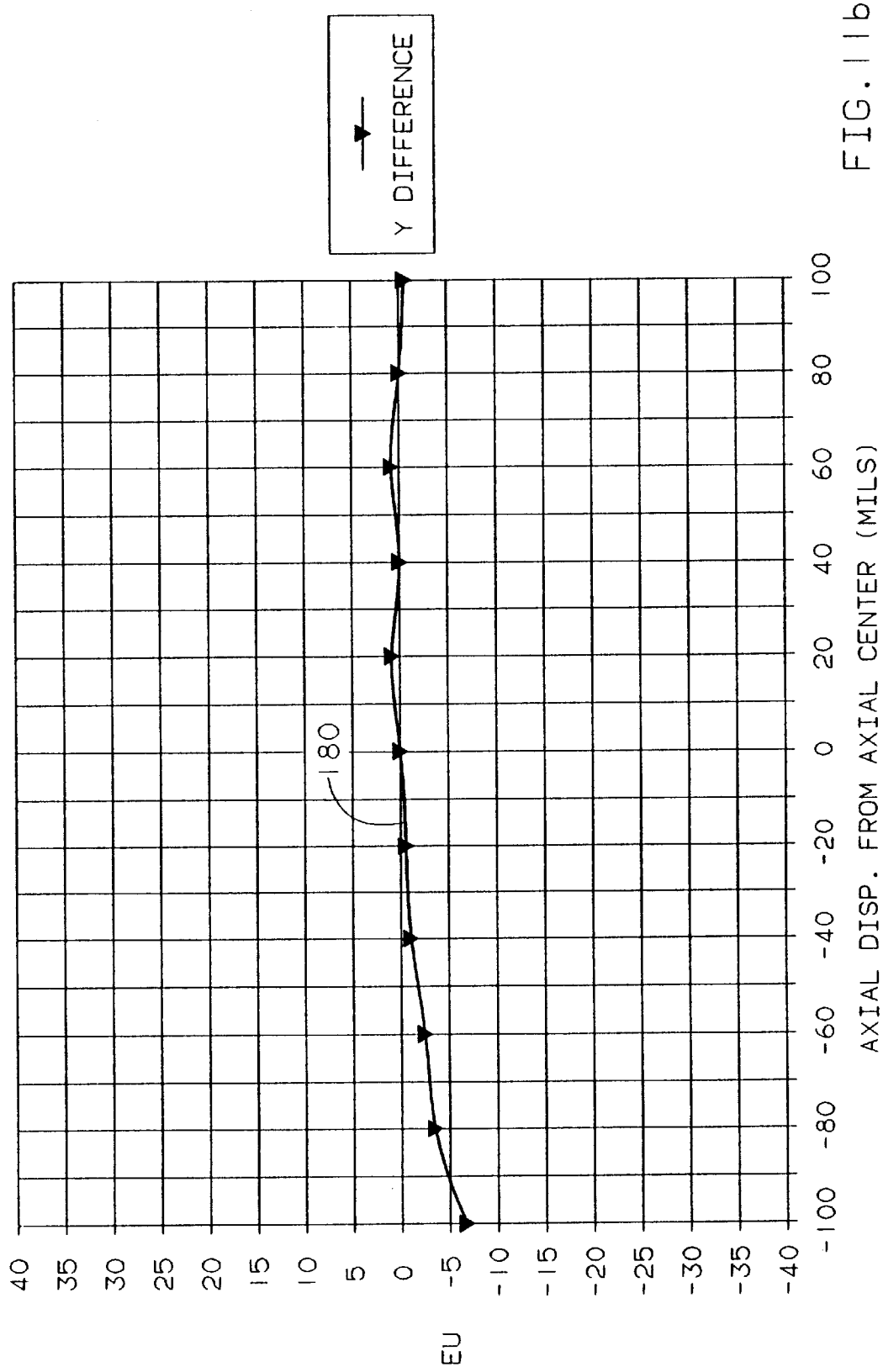
FIG. 11b is a graphical illustration of the combined bearing wear monitor sensor outputs from the radial sensors of FIG. 11a indicating axial displacement with no radial displacement from radial center.
Figure 12A:
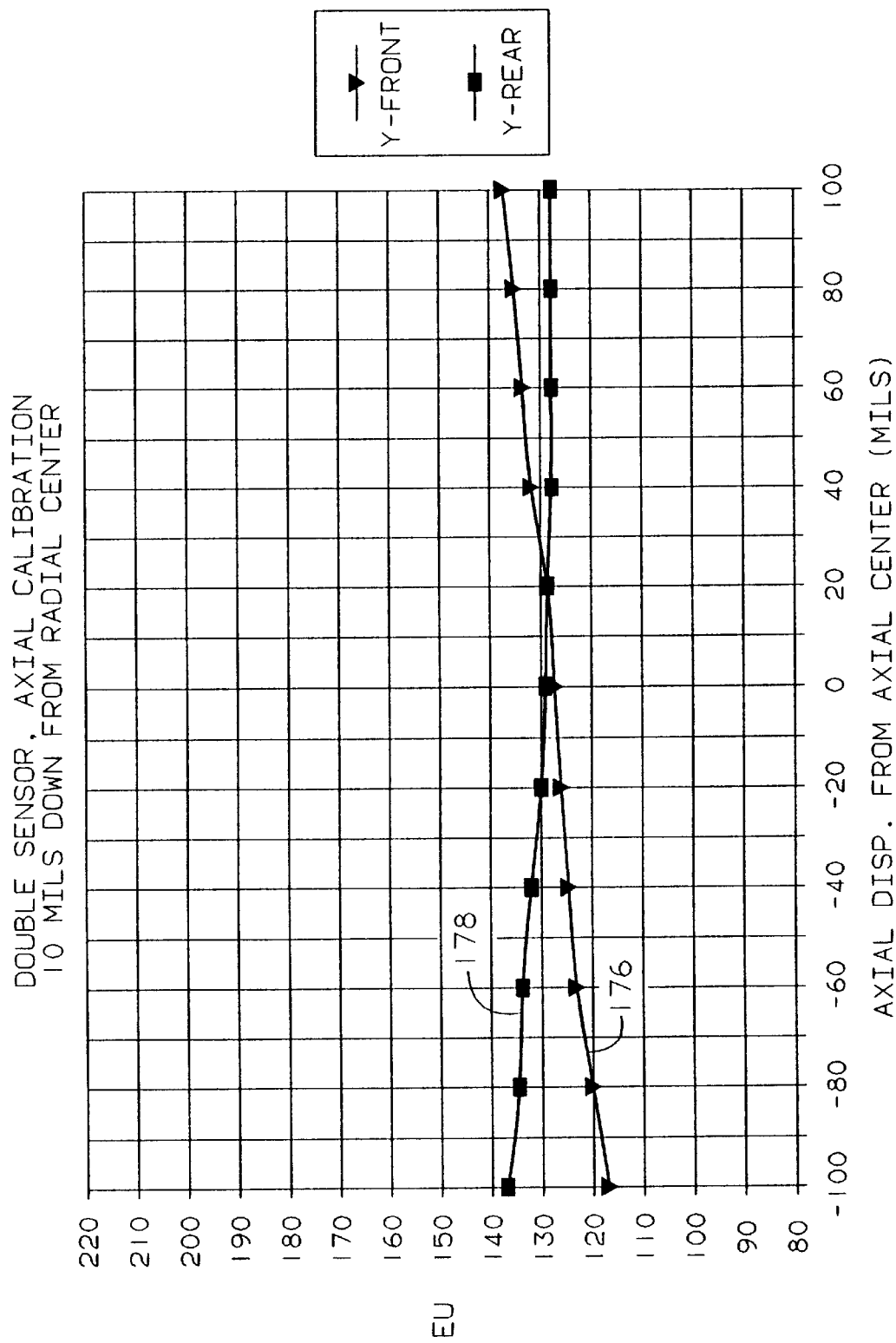
FIG. 12a is a graphical illustration of the bearing wear monitor sensor outputs from the radial sensors utilized to calculate axial displacement with a radial displacement of 10 mils down from radial center of the embodiment of FIG. 6d.
Figure 12B:
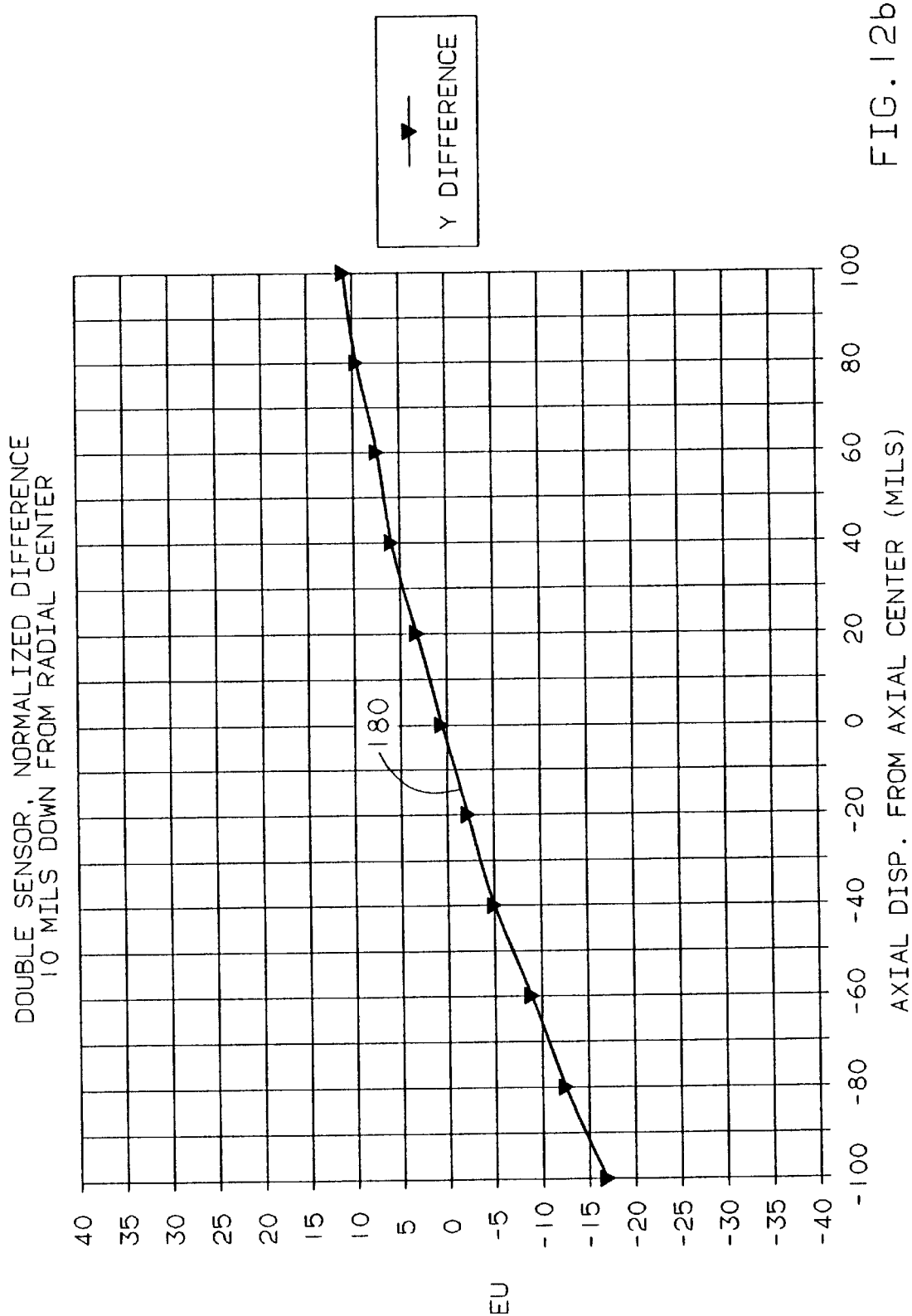
FIG. 12b is a graphical illustration of the combined bearing wear monitor sensor outputs from the radial sensors of FIG. 12a indicating axial displacement with a radial displacement of 10 mils down from radial center.
Figure 13A:
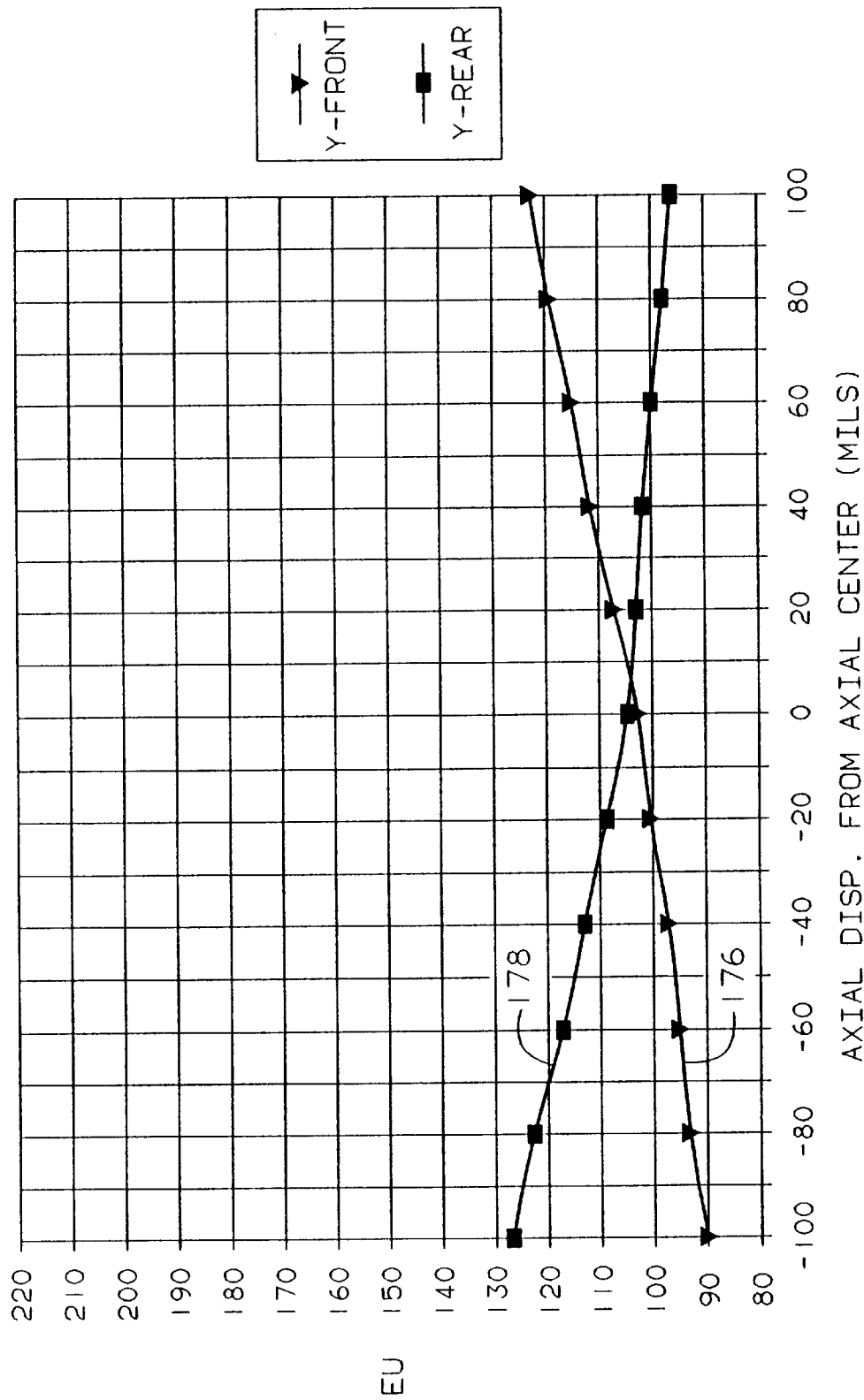
FIG. 13a is a graphical illustration of the bearing wear monitor sensor outputs from the radial sensors utilized to calculate axial displacement with a radial displacement of 20 mils down from radial center of the embodiment of FIG. 6d.
Figure 13B:
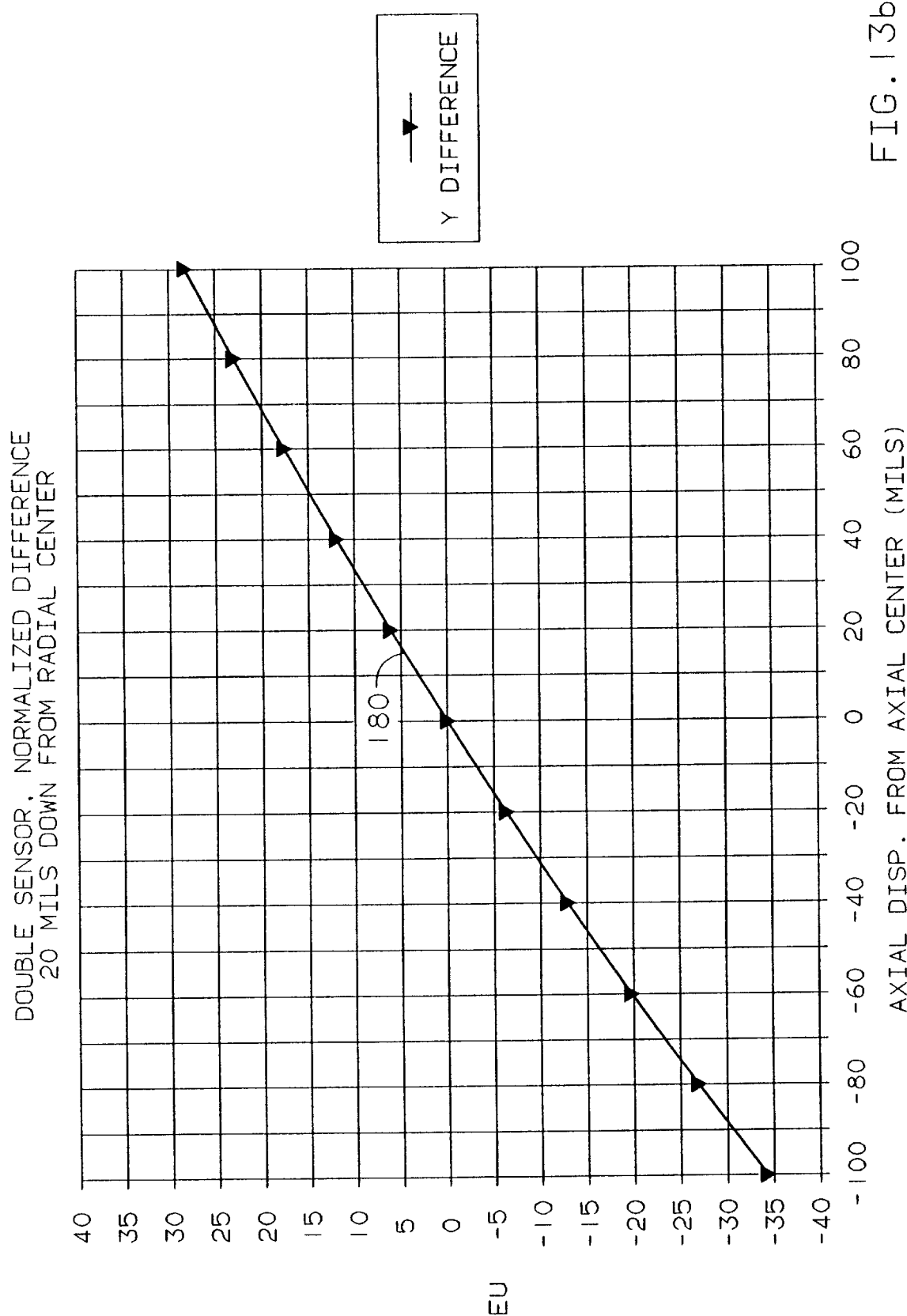
FIG. 13b is a graphical illustration of the combined bearing wear monitor sensor outputs from the radial sensors of FIG. 13a indicating axial displacement with a radial displacement of 20 mils down from radial center.

FIG. 8 shows a typical frequency spectrum of the net output signal from a pair of radial or axial sensing windings. The spectrum is seen to include a set of low frequency components 170 which are unavoidably induced by the motor excitation fields. These frequency components 170 exist at the motor excitation frequency and multiples thereof. In most situations, these undesirable components 170 are confined to a range below 1 kHz and are rejected by the synchronous detector 112 of FIG. 1. Centered around the sensor excitation frequency 172 is yet another group of components 174a, 174b that relate to the dynamic displacement of the rotor. At exactly the excitation frequency, there is a single component 172 whose magnitude depends upon the static or average displacement of the rotor. The synchronous detector 112 (see FIG. 1) is a well known electronic system for resolving this component into a DC voltage representing the displacement of the rotor. For a rotor whose displacement varies sinusoidally at the rotation frequency of the rotor, as is often the case, there will be two components 174a, 174b spaced apart from the excitation frequency by the rotor rotation frequency. This spacing is designated f in FIG. 8. It is also well known that the synchronous detector will convert this frequency spectrum into an output signal that varies sinusoidally in direct correspondence with the sinusoidally varying displacement. Displacements that are not sinusoidal may also be present producing a more complex spectrum. The synchronous detector within the frequency limits of its output filter will also correctly resolve this more complex spectrum into a non-sinusoidally varying output signal corresponding to the non-sinusoidally varying displacement of the rotor The configuration of FIG. 6b utilizes an axially staggered sensor assembly which uses 4 sensors located every 90 degrees like the configuration of FIG. 6a, but with the four sensors 104 located in two different axial planes 166a, 166c on the same end of the motor 100. The 4 sensors are paired, with 2 of them in one axial plane 166a and the other 2 in a different axial plane 166c. The axial distance between them is dependent upon the width of the target. The radial outputs from this configuration are the same as the original configuration previously disclosed. The axial output is now based on an appropriate combination of all 4 sensors in two axial planes similar to that described above. Here, the axial output from the two sensors in one axial plane 166a are added together, as is the axial output from the two sensors in the other axial plane 166c. These two summed outputs are then differentially summed to generate an axial displacement signal. For this configuration, the sensors 104 in the axial plane 166b no longer need to include the axial displacement sense coils, reducing the cost of these sensors.

Figure 6C:
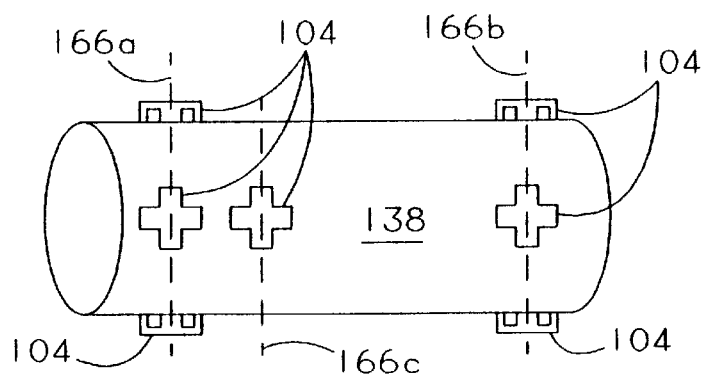
FIG. 6c is external view simplified block diagram of the bearing wear monitor sensor placement of an alternate embodiment of the instant invention.

The configuration of FIG. 6c uses a total of 6 sensors, 4 every 90 degrees in one axial plane 166a and 2 in another axial plane 166c at 180 degrees, radially aligned with 2 of the other 4 in axial plane 166a. This configuration senses radial displacement on either end of the motor 100 using the 4 sensors in each axial plane 166a and 166b respectively. The axial displacement is determined by combining the axial output windings of the 4 radially aligned sensors in different axial planes 166a and 166c. Here, the axial output from the two sensors in one axial plane 166a are added together, as is the axial output from the two sensors in the other axial plane 166c. These two summed outputs are then differentially summed to generate an axial displacement signal. The alignment of the sensors to the target is the same as before, with the edge of the target aligned with the center of the sensor. This configuration, unlike the configuration of FIG. 6b, maintains both axial and radial symmetry of the sensors.

Figure 6D:
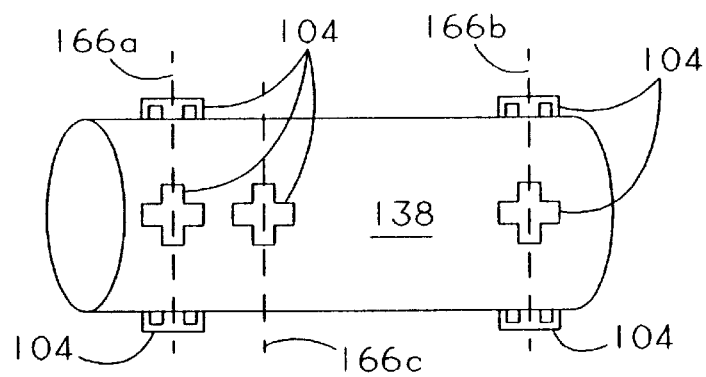
FIG. 6d is external view simplified block diagram of the bearing wear monitor sensor placement of an alternate embodiment of the instant invention.

The configuration of FIG. 6d utilizes two radial displacement signals to produce the axial displacement, and is particularly useful in environments having high electromagnetic interference. As discussed above with regard to the embodiment of FIG. 6a, the alignment of the target with the sensor is such that the radial sensors are sensitive to both radial and axial displacement. In fact it is this characteristic that is utilized with the configuration of FIG. 6d to determine the axial displacement. This configuration also eliminates the need to correct the radial signal due to its axial sensitivity as discussed above. Using the physical configuration of FIG. 6c, the 4 sensors that previously provided a single axial output (2 sensors in axial plane 166a and the 2 sensors in axial plane 166c which are radially aligned with the first sensors) are used to provide 2 radial outputs that are sensitive to axial displacement. That is to say, each sensor pair in one axial plane produces a radial displacement signal whose output is sensitive to an axial displacement of the rotor target. However, since the rotor target will move toward one pair and away from the other, the effect of the axial displacement is opposite for these two radial outputs (i.e., one pair becomes more sensitive to radial displacement as the rotor target moves toward them while the other pair becomes less sensitive to radial displacement as the rotor target moves away from them).

This may better be understood by reference to FIGS. 9 through 13. FIGS. 9a, 10a, 11a, 12a, and 13a graphically illustrate the 2 radial outputs at a fixed radial position with axial displacement as the variable. Note that the sign of the slope of Y-Front 176 (the sensor in axial plane 166a) and Y-Rear 178 (the sensors in axial plane 166c) change with up or down displacement in the radial axis. Note also from FIG. 11a that with zero radial displacement the 2 outputs are essentially flat lines with no sensitivity to axial displacement. To determine the radial position, the average DC offset of the two radial signals 176, 178 is determined and compared to the DC offset with zero radial and axial displacement. The DC offset will be positive or negative depending upon the direction of the radial displacement. Once the radial position is determined, the two radial outputs 176, 178 are combined to provide the axial displacement 180 as indicated by FIGS. 9b, 10b, 11b, 12b, and 13b.

Although the data shown in FIGS. 9a through 13a indicate that the 2 radial outputs criss-cross at approximately zero axial displacement, due to manufacturing tolerances they may not. To accommodate for this the 2 sets of radial data 176, 178 need to be Normalized about zero EU. (an EU is one count out of the 8 bit A/D converter 114 of FIG. 1, with 0 to 255 EU.'s being full scale and corresponding to 0 to 5 volts.) Normalization is accomplished by subtracting the actual value of Y-Front 176 and Y-Rear 178 from their respective calibrated zero values. The calibrated zero values would be taken as the values with zero radial and axial displacement. Once the two data points have been normalized Y-Front 176 is subtracted from Y-Rear 178. Knowing the radial displacement as calculated above indicates what sensitivity each sensor has to axial displacement, and therefore, which curve 180 (FIGS. 9b, 10b, 11b, 12b, and 13b) is required. As an example, assume the radial position is determined to be 20 mills up and that the difference between Y-Front 176 and Y-Rear 178 is 15 counts. With reference to FIG. 9b, it can be determined that the axial displacement 180 is –40 mills from zero.

With this configuration (see FIG. 6d) only two windings are needed on the sensor assembly, the excitation coils and the radial sense coils. As stated above, this configuration uses 4 sensors on one end and 6 on the other with 2 windings per sensor, but only requires 4 connections per winding. Certainly reducing the number of interconnections is a benefit to reliability and based on the elimination of the need for a separate axial sense winding, the size of the sensor 104 may be reduced, or the number of turns may be increased to correspondingly increase the sensitivity. Just by reducing the number of coils on the winding the cost for the windings is also reduced. Another benefit of this configuration is that since there is no longer any reason to have three of the four radial sensors sensitive to axial position, the sensors may be positioned appropriately over their respective targets thereby eliminating any need within the software to correct their output based on axial position.

Figure 14:
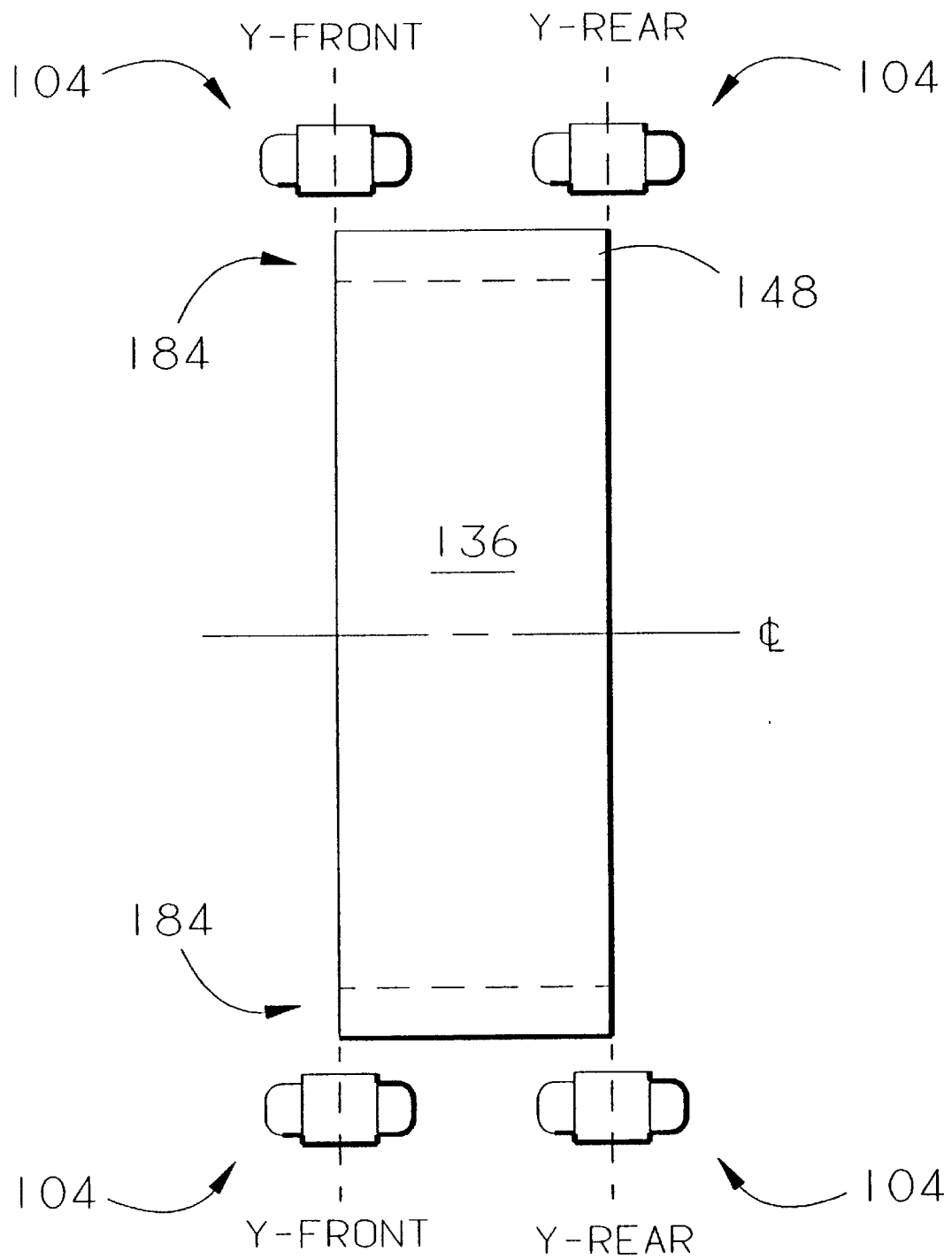
FIG. 14 is a cross sectional view of a rotor target configuration and sensor placement in accordance with an embodiment of the instant invention.
Figure 15:
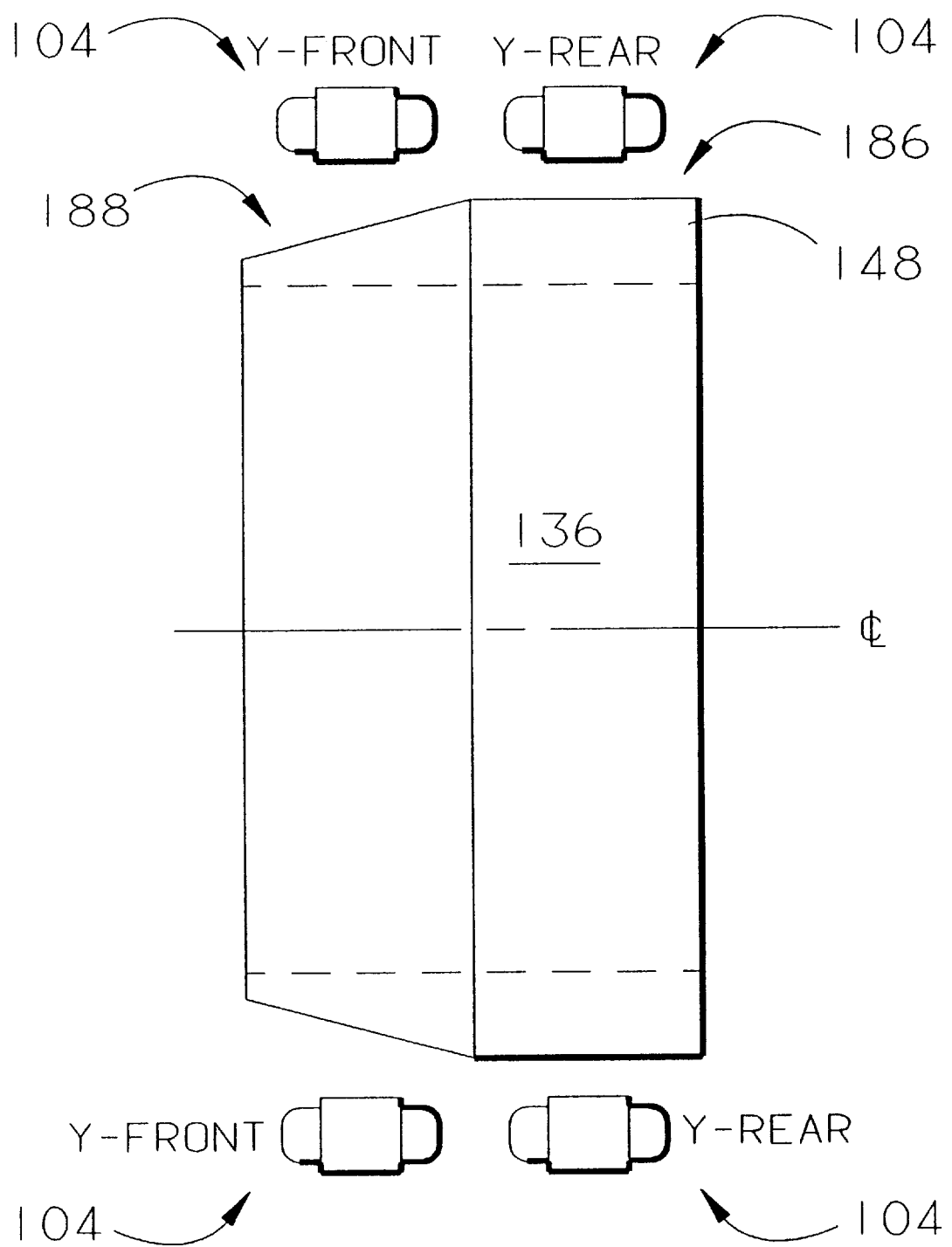
FIG. 15 is a cross sectional view of a rotor target configuration and sensor placement in accordance with an embodiment of the instant invention.
Figure 16:
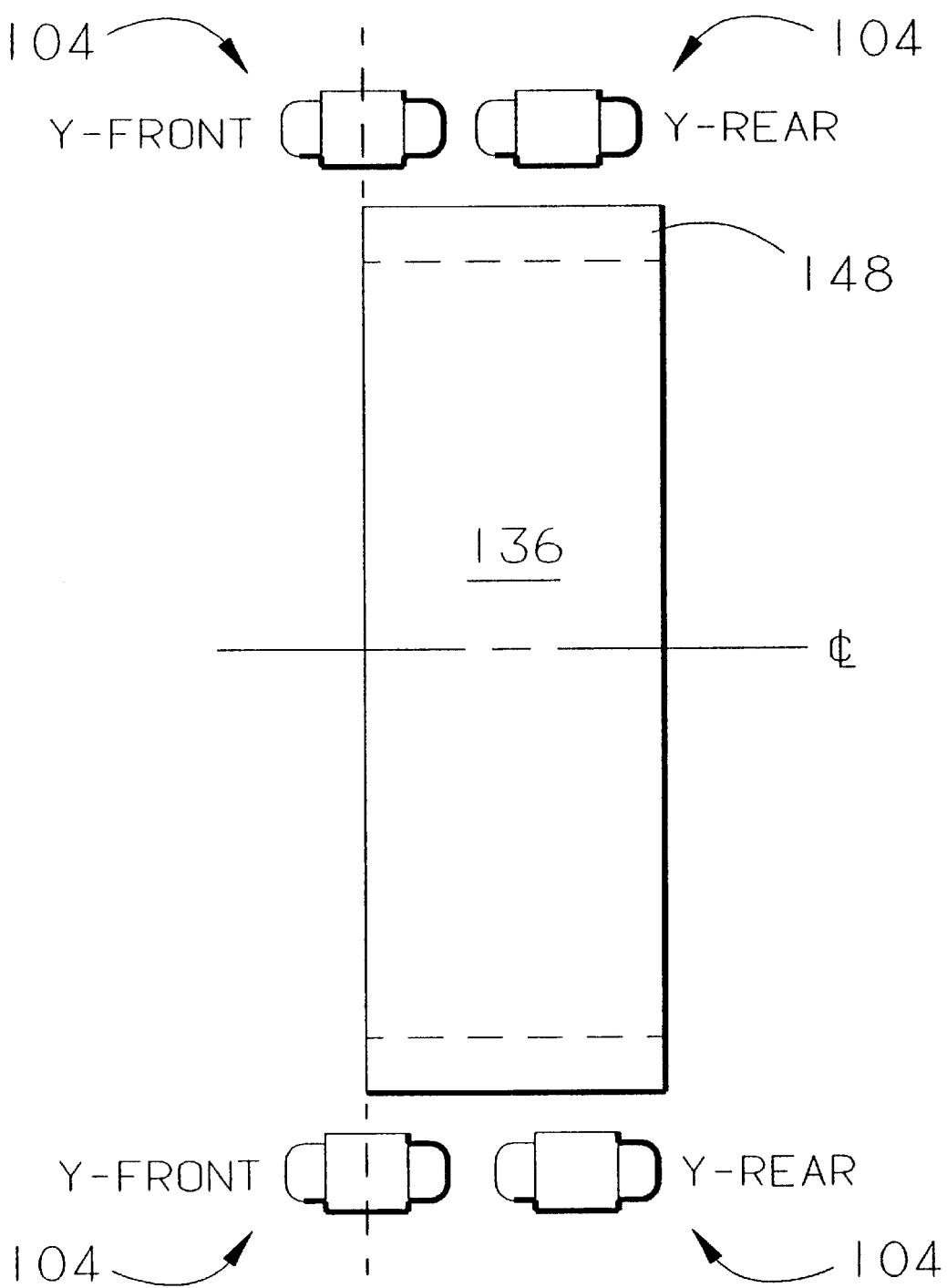
FIG. 16 is a cross sectional view of a rotor target configuration and sensor placement in accordance with an embodiment of the instant invention.

An embodiment of the target 148 used with the above configuration (see FIG. 6d) is illustrated in FIG. 14. This target configuration is a simple ring with the ends trimmed off square. The edges 184 of this target 148 must be aligned with the center line of the two sensors 104 as illustrated in FIG. 14. An alternate target configuration is illustrated in FIG. 15. In this alternate embodiment, the target 148 is longer than that illustrated in FIG. 14, with both a straight 186 and a conical 188 section. Both sensors 104 completely cover the target 148, one over the straight section 186 and one over the conical section 188. The sensor output from the use of this target configuration would now have one sloped line and one flat line (reference FIGS. 9a, 10a, 11a, 12a, and 13a). In yet a further alternative target configuration, as illustrated in FIG. 16, the target 148 is a little longer than the configuration of FIG. 14 so that one radial sensor is not sensitive to axial displacement and the other one is sensitive.

Figure 17:
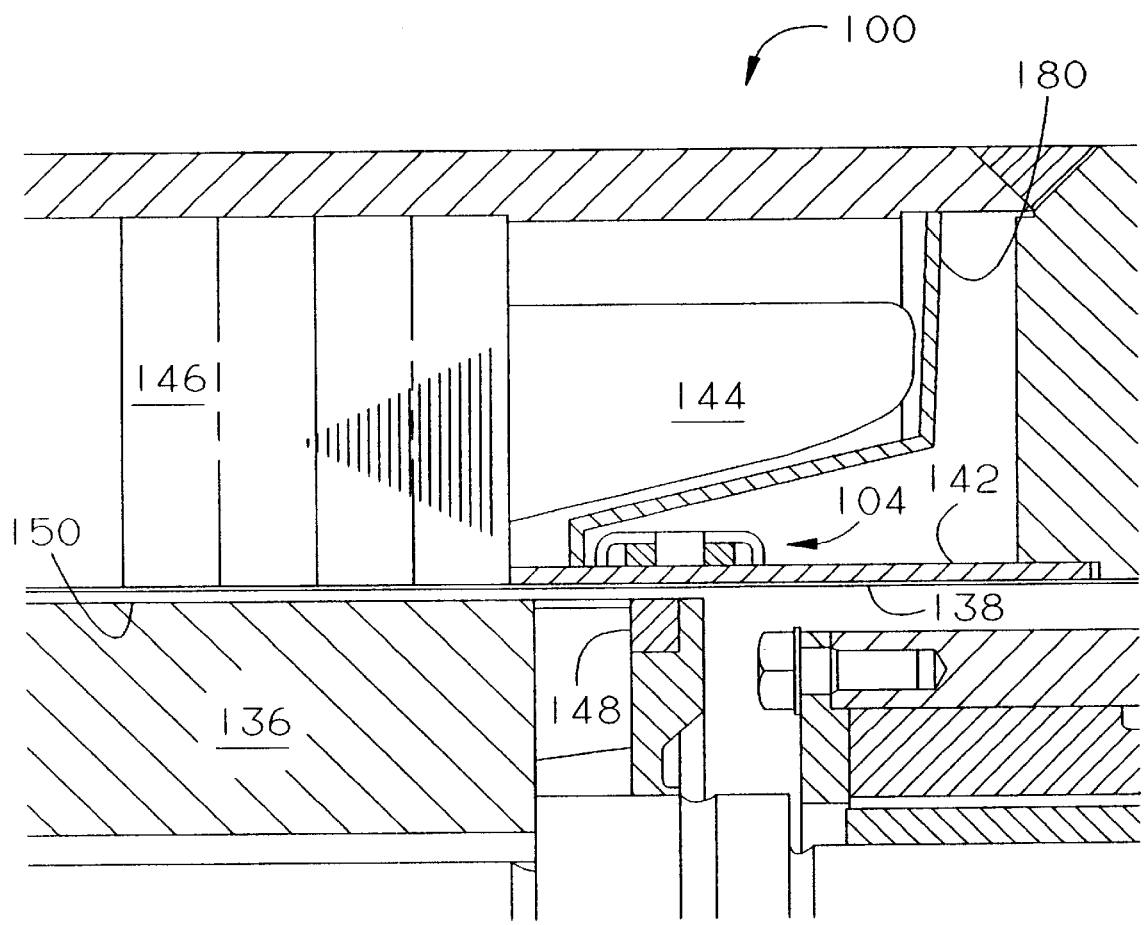
FIG. 17 is a cross sectional view of an embodiment of the instant invention utilizing a conical electromagnetic shield in accordance with an embodiment of the instant invention.
Figure 18:
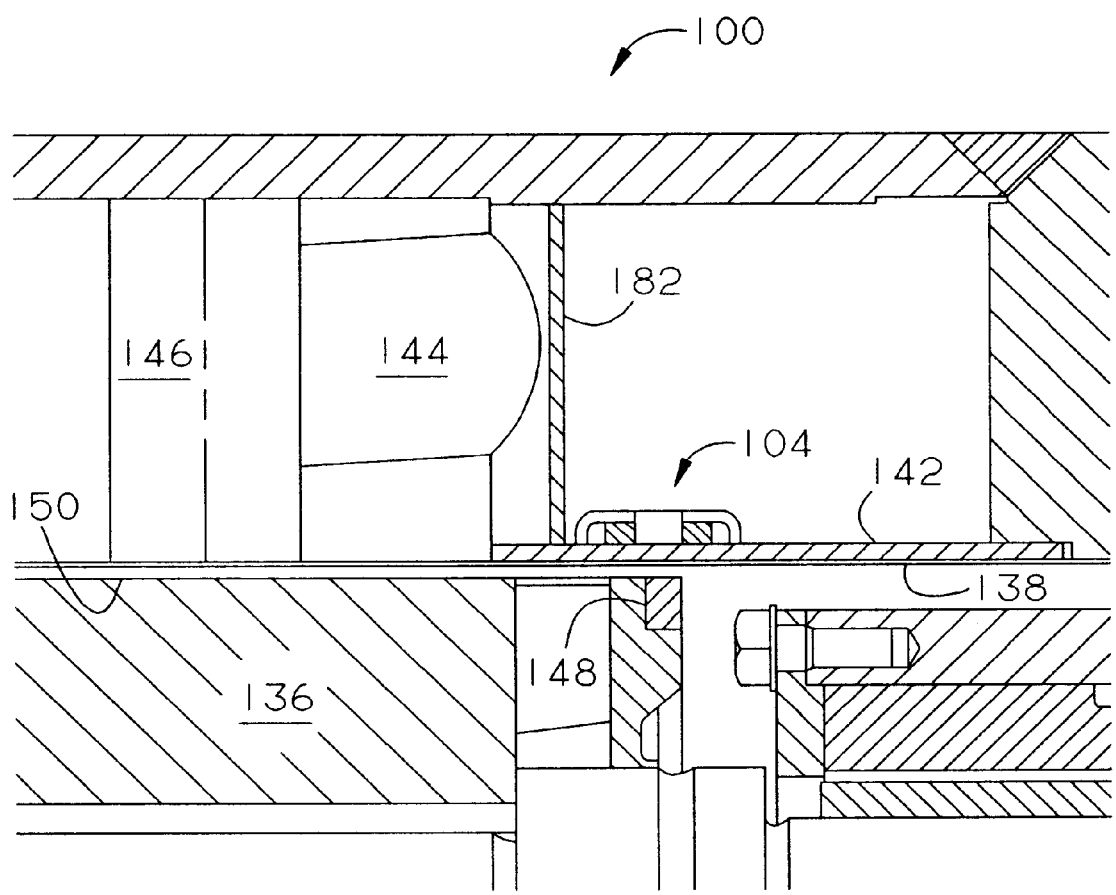
FIG. 18 is a cross sectional view of an embodiment of the instant invention utilizing a flat plate electromagnetic shield in accordance with an embodiment of the instant invention.

The above described sensor configuration (see FIG. 6d) provides accurate axial and radial displacement data, even in environments with high electromagnetic interference, due to the axial and radial symmetry of the sensor placement and the differential connections of the sensor pairs. If the electromagnetic interference from the motor windings becomes excessive, however, it may be required to shield the sensors 104 from the stator winding 144 radiated noise. FIG. 17 illustrates an embodiment of the instant invention which allows placement of the sensors 104 in axial proximity to the stator windings 144 by using a conical shield 180. This conical shield 180 substantially reduces the electromagnetic interference from the stator windings 144, and allows the synchronous detector 112 (see FIG. 1) to operate properly. FIG. 18 illustrates an alternate embodiment which utilizes a plate shield 182 to separate the sensor 104 from the stator winding radiated noise. In this embodiment the sensors 104 are positioned in a separate axial plane than the stator windings 144 which further reduces the effect of the radiated noise on the sensors 104.

Figure 19:
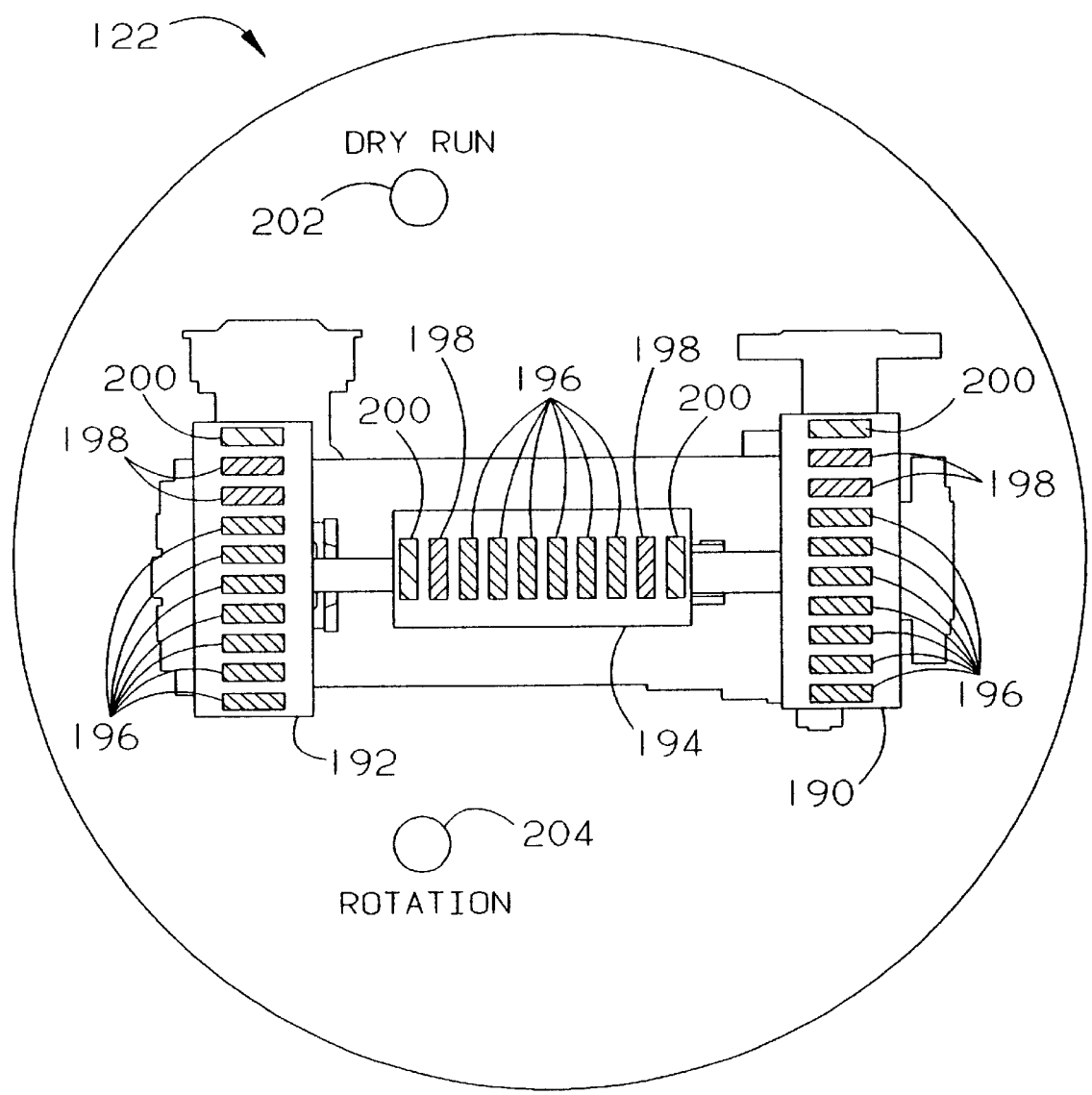
FIG. 19 is a pictorial illustration of the bearing wear monitor output display in accordance with an embodiment of the instant invention.
Figure 20:
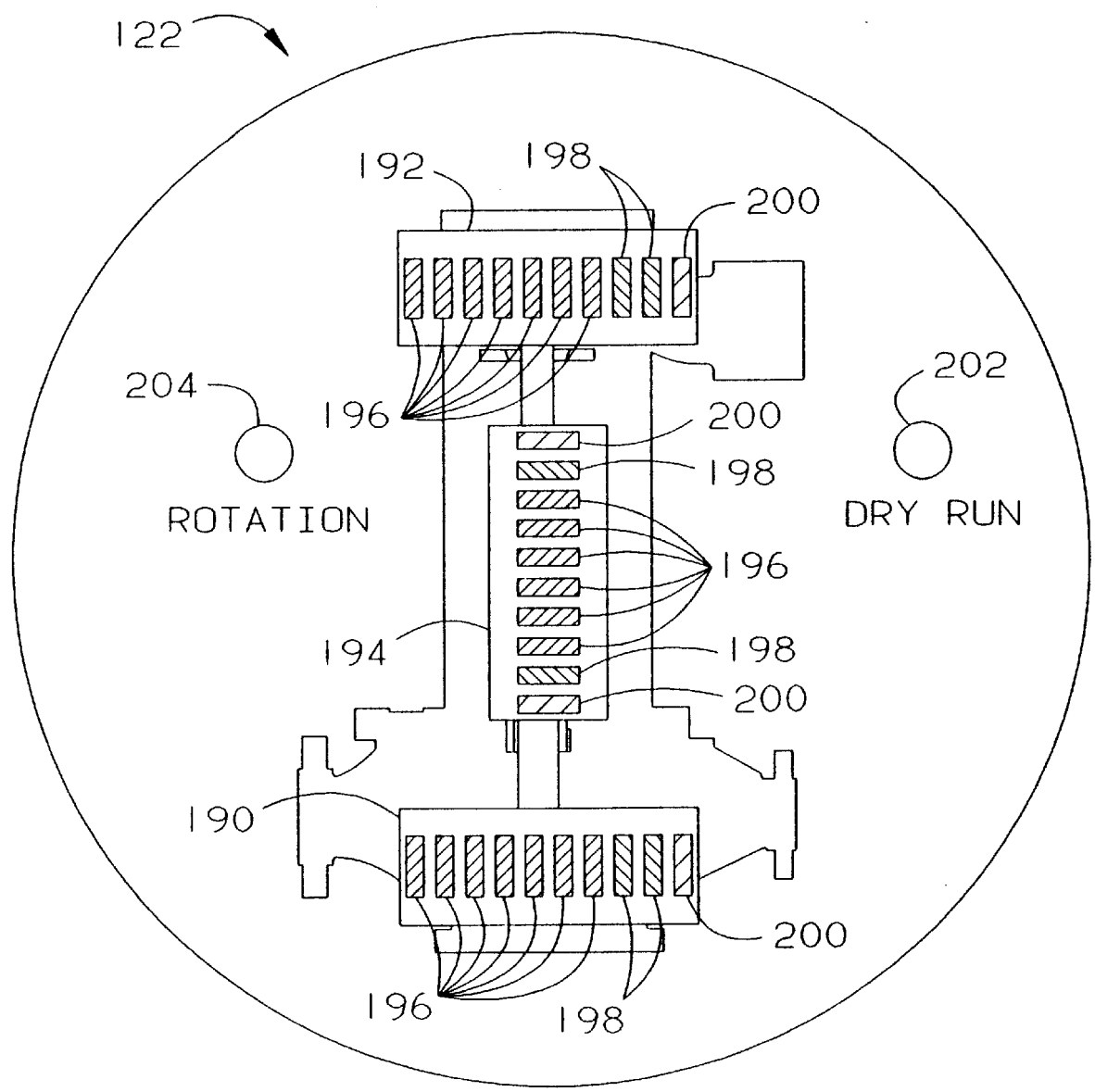
FIG. 20 is a pictorial illustration of the bearing wear monitor output display in accordance with an alternate embodiment of the instant invention.

As the axial and radial displacement of the rotor is determined by the above described embodiments, an incremental display of this information is provided to allow maintenance personnel monitor ongoing bearing wear. This allows them to schedule maintenance and avoid excessive down time due to unrecognized excessive bearing wear. FIG. 19 illustrates an embodiment of the display 122 used in accordance with the instant invention. This display 122 provides an incremental display for each area of bearing wear, including an incremental display 190 to illustrate radial bearing wear on the pump end, an incremental display 192 to illustrate radial bearing wear on the motor end, and an incremental display 194 to illustrate the extent and the direction of axial bearing wear. These incremental displays include several green indicators 196 which indicate incremental acceptable bearing wear, a few yellow indicators 198 which indicate incremental bearing wear beyond an acceptable amount which now requires maintenance, and at least one red indicator 200 which indicates that the incremental bearing wear has now become excessive. To further aid the maintenance personnel, the incremental displays 190, 192, and 194 are positioned on an outline of the canned motor pump in proximity to the bearings monitored. FIG. 19 illustrates the display configuration for a horizontal type canned motor pump, while FIG. 20 illustrates the display configuration for a vertical type canned motor pump. Indication is also provided for a dry run condition 202, and for a direction of rotation condition 204.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A bearing monitor for use with a canned motor pump having a wound stator and a rotor drivably coupled to an impeller, the rotor being mounted on radial journal bearings and axial thrust bearings within a containment can and exposed to process fluid being pumped by the canned motor pump, the wound stator being mounted external to the containment can and isolated from the process fluid, comprising:

a first target embedded in an outer periphery of the rotor in axial proximity to a first end of the rotor;

a first and a second sensor mounted external to the containment can in axial proximity to said first target and radially displaced approximately equally around the periphery of the containment can;

a magnetic field generating means operatively coupled to said first and said second sensors for generating a first and a second local magnetic field, each local magnetic field being coupled through the containment can, process fluid, rotor, and said first target to each of said sensors, said first and said second sensors each generating an output signal in response thereto;

a monitor circuit coupled to said first and said second sensors, said monitor circuit comparing said output signal from said first sensor with said output signal from said second sensor, said monitor circuit generating a scaled output in response to a difference therebetween, said difference being approximately linearly related to bearing wear in a first radial direction on the first end of the rotor;

a second target embedded in an outer periphery of the rotor in axial proximity to a second end of the rotor;

a third and a fourth sensor mounted external to the containment can in axial proximity to said second target, said third and said fourth sensors radially displaced approximately equally around the periphery of the containment can;

wherein said magnetic field generating means is also operably coupled to said third and said fourth sensors for generating a third and a fourth local magnetic field, said third and said fourth sensors each generating an output signal in response thereto;

wherein said monitor circuit is also coupled to said third and said fourth sensors, said monitor circuit comparing said output signal from said third sensor with said output signal from said fourth sensor, said monitor circuit generating a scaled output in response to a difference therebetween, said difference being approximately linearly related to bearing wear in a second radial direction on the second end of the rotor; and a fifth and a sixth sensor mounted external to the containment can in an axial plane with said first and said second sensors, said fifth and said sixth sensors radially displaced approximately equally around the periphery of the containment can, equally displaced from said first and said second sensors;

wherein said magnetic field generating means is also operably coupled to said fifth and said sixth sensors for generating a fifth and a sixth local magnetic field, said fifth and said sixth sensors each generating an output signal in response thereto;

wherein said monitor circuit is also coupled to said fifth and said sixth sensors, said monitor circuit comparing said output signal from said fifth sensor with said output signal from said sixth sensor, said monitor circuit generating a scaled output in response to a difference therebetween said difference being approximately linearly related to bearing wear in a third radial direction orthogonal to said first radial direction on the first end of the rotor; and wherein said first and said second sensors are in a first axial plane, and said third and said fourth sensors are in a second axial plane axially displaced from said first axial plane.

2. The bearing monitor of claim 1, wherein said monitor circuit combines said output signals from said first and said second sensors to form a first axial signal, and from said fifth and said sixth sensors to form a second axial signal, said monitor circuit further comparing said first axial signal with said second axial signal, said monitor circuit generating a scaled output in response to a difference therebetween, said difference being approximately linearly related to bearing wear in an axial direction.

3. The bearing monitor of claim 2, further comprising an electromagnetic shield interposed between said sensors and said wound stator.

4. The bearing monitor of claim 3, wherein said sensors are positioned in axial proximity with windings of the wound stator, and wherein said electromagnetic shield is conically positioned between said sensors and the windings.

5. The bearing monitor of claim 3, wherein said sensors are positioned in separate axial planes than windings of the wound stator, and wherein said electromagnetic shield is positioned in an axial plane separating said sensors from the windings.

6. The bearing monitor of claim 1, further comprising:

a seventh and an eighth sensor mounted external to the containment can in the second axial plane with said third and said fourth sensors, said seventh and said eighth sensors radially displaced approximately equally around the periphery of the containment can, equally displaced from said third and said fourth sensors;

wherein said magnetic field generating means is also operably coupled to said seventh and said eighth sensors for generating a seventh and an eighth local magnetic field, said seventh and said eighth sensors each generating an output signal in response thereto; and wherein said monitor circuit is also coupled to said seventh and said eighth sensors, said monitor circuit comparing said output signal from said seventh sensor with said output signal from said eighth sensor, said monitor circuit generating a scaled output in response to a difference therebetween, said difference being approximately linearly related to bearing wear in a fourth radial direction orthogonal to said second radial direction on the second end of the rotor.

7. The bearing monitor of claim 6, wherein said monitor circuit combines said outputs from said first, said second, said fifth, and said sixth sensors to form a first axial output signal and combines said outputs from said third, said fourth, said seventh, and said eighth sensors to form a second axial output signal, said monitor circuit generating a scaled output in response to a difference therebetween, said difference being approximately linearly related to bearing wear in an axial direction.

8. The bearing monitor of claim 7, further comprising an electromagnetic shield interposed between said sensors and said wound stator.

9. The bearing monitor of claim 8, wherein said sensors are positioned in axial proximity with windings of the wound stator, and wherein said electromagnetic shield is conically positioned between said sensors and the windings.

10. The bearing monitor of claim 8, wherein said sensors are positioned in a separate axial plane than windings of the wound stator, and wherein said electromagnetic shield is positioned in an axial plane separating said sensors from the windings.

11. The bearing monitor of claim 6, further comprising:
a ninth and a tenth sensor mounted external to the containment can in an axial plane displaced from said first and said second sensors, said ninth and said tenth sensors radially displaced approximately equally around the periphery of the containment can, radially aligned with said first and said second sensors; and wherein said magnetic field generating means is also operably coupled to said ninth and said tenth sensors for generating a ninth and a tenth local magnetic field, said ninth and said tenth sensors each generating an output signal in response thereto; and wherein said monitor circuit is also coupled to said ninth and said tenth sensors, said monitor circuit combining said output signal from said ninth sensor with said output signal from said tenth sensor to form a first axial output signal, said monitor circuit further combining said output signal from said first sensor with said output signal from said second sensor to form a second axial output signal, said monitor circuit generating a scaled output in response to a difference between said first and said second axial output signals, said difference being approximately linearly related to bearing wear in an axial direction.

12. The bearing monitor of claim 11, further comprising an electromagnetic shield interposed between said sensors and said wound stator.

13. The bearing monitor of claim 12, wherein said sensors are positioned in axial proximity with windings of the wound stator, and wherein said electromagnetic shield is conically positioned between said sensors and the windings.

14. The bearing monitor of claim 12, wherein said sensors are positioned in separate axial planes than windings of the wound stator, and wherein said electromagnetic shield is positioned in an axial plane separating said sensors from the windings.

15. The bearing monitor of claim 9, further comprising:
a ninth and a tenth sensor mounted external to the containment can in an axial plane displaced from said first and said second sensors, said ninth and said tenth sensors radially displaced approximately equally around the periphery of the containment can, radially aligned with said first and said second sensors; and wherein said magnetic field generating means is also operably coupled to said ninth and said tenth sensors for generating a ninth and a tenth local magnetic field, said ninth and said tenth sensors each generating an output signal in response thereto; and wherein said monitor circuit is also coupled to said ninth and said tenth sensors, said monitor circuit differentially combining said output signal from said ninth sensor with said output signal from said tenth sensor to form a first axial output signal, said monitor circuit further differentially combining said output signal from said first sensor with said output signal from said second sensor to form a second axial output signal, said monitor circuit generating a scaled output in response to a difference between said first and said second axial output signals, said difference being approximately linearly related to bearing wear in an axial direction.

16. The bearing monitor of claim 15, further comprising an electromagnetic shield interposed between said sensors and said wound stator.

17. The bearing monitor of claim 16, wherein said sensors are positioned in axial proximity with windings of the wound stator, and wherein said electromagnetic shield is conically positioned between said sensors and the windings.

18. The bearing monitor of claim 16, wherein said sensors are positioned in separate axial planes than windings of the wound stator, and wherein said electromagnetic shield is positioned in an axial plane separating said sensors from the windings.

19. The bearing monitor of claim 15, wherein said first target comprises a ring having a first and a second square end.

20. The bearing monitor of claim 19, wherein said first and said second sensors are located in an axial plane defining said first square end of said first target, and said ninth and said tenth sensors are located in an axial plane defining said second square end of said first target.

21. The bearing monitor of claim 19, wherein said first and said second sensors are located in an axial plane defining said first square end of said first target, and said ninth and said tenth sensors are located in axial proximity to said first target displaced from said second square end of said first target.

22. The bearing monitor of claim 15, wherein said first target comprises an elongated ring having a constant diameter section and a conical section, and wherein said first and said second sensors are positioned in axial proximity to said conical section, and wherein said ninth and said tenth sensors are positioned in axial proximity to said constant diameter section.

23. A bearing monitor for a motor having a wound stator and a rotor, the rotor being mounted on radial journal bearings and axial thrust bearings within a containment housing, the wound stator being mounted external to the containment housing, comprising:

first means positioned external to the containment housing for sensing a radial displacement of the rotor, said first means generating a first scaled output signal approximately linearly related to wear of the radial journal bearings;

second means positioned external to the containment housing for sensing an axial displacement of the rotor, said second means generating a second scaled output signal approximately linearly related to wear of the axial thrust bearings; and third means responsive to said first scaled output signal and to said second scaled output signal for displaying an incremental amount of bearing wear in both an axial and a radial direction;

wherein said first means comprises a plurality of radial sensor assemblies positioned radially equidistant about either end of the rotor by sensor mounting means, said radial sensor assemblies comprising a means for generating a local magnetic field and at least one radial sense coil, and wherein said local magnetic field induces a voltage in said at least one radial sense coil, said induced voltage varying with radial displacement of the rotor; and wherein said sensor mounting means comprises a spider pole piece having a first pair and a second pair of legs, said first pair of legs being mounted along an axial axis of said containment housing, said second pair forming a pole piece for said means for generating a local magnetic field and for said at least one radial sense coil.

24. The bearing monitor of claim 23, wherein said means for generating a local magnetic field comprises at least one excitation coil coupled to a source of excitation.

25. A bearing monitor for a motor having a wound stator and a rotor, the rotor being mounted on radial journal bearings and axial thrust bearings within a containment housing, the wound stator being mounted external to the containment housing, comprising:

first means positioned external to the containment housing for sensing a radial displacement of the rotor, said first means generating a first scaled output signal approximately linearly related to wear of the radial journal bearings;

second means positioned external to the containment housing for sensing an axial displacement of the rotor, said second means generating a second scaled output signal approximately linearly related to wear of the axial thrust bearings; and third means responsive to said first scaled output signal and to said second scaled output signal for displaying an incremental amount of bearing wear in both an axial and a radial direction;

wherein said first means comprises a plurality of radial sensor assemblies positioned radially equidistant about either end of the rotor by sensor mounting means, said radial sensor assemblies comprising a means for generating a local magnetic field and at least one radial sense coil, and wherein said local magnetic field induces a voltage in said at least one radial sense coil, said induced voltage varying with radial displacement of the rotor; and wherein said sensor mounting means comprises a spider pole piece having a first pair and a second pair of legs, said first pair of legs being mounted along an axial axis of said containment housing, said second pair forming a pole piece, and wherein said radial sensor assembly comprises two radial sense coils electrically additively coupled and mounted on said second pair of legs, and wherein said means for generating a local magnetic field comprises two excitation coils electrically additively coupled and mounted on said second pair of legs.

26. A bearing monitor for a motor having a wound stator and a rotor, the rotor being mounted on radial journal bearings and axial thrust bearings within a containment housing, the wound stator being mounted external to the containment housing, comprising:

first means positioned external to the containment housing for sensing a radial displacement of the rotor, said first means generating a first scaled output signal approximately linearly related to wear of the radial journal bearings;

second means positioned external to the containment housing for sensing an axial displacement of the rotor, said second means generating a second scaled output signal approximately linearly related to wear of the axial thrust bearings; and third means responsive to said first scaled output signal and to said second scaled output signal for displaying an incremental amount of bearing wear in both an axial and a radial direction;

wherein said first means comprises a plurality of radial sensor assemblies positioned radially equidistant about either end of the rotor by sensor mounting means, said radial sensor assemblies comprising a means for generating a local magnetic field and at least one radial sense coil, and wherein said local magnetic field induces a voltage in said at least one radial sense coil, said induced voltage varying with radial displacement of the rotor; and wherein said second means comprises a plurality of axial sensor assemblies positioned radially equidistant in a first and a second axial plane about a first end of the rotor by sensor mounting means, said axial sensor assemblies comprising a means for generating a local magnetic field and at least one axial sense coil, and wherein said local magnetic field induces a voltage in said at least one axial sense coil, said induced voltage varying with axial displacement of the rotor.

27. The bearing monitor of claim 26, wherein said axial sensor assemblies in said first axial plane are radially aligned with said axial sensor assemblies in said second axial plane.

28. The bearing monitor of claim 27, wherein said axial sensor assemblies in said first axial plane are electrically combined with said axial sensor assemblies in said second axial plane to produce an axial output voltage displacement signal which varies with axial displacement of the rotor.

29. The bearing monitor of claim 27, wherein a first and a second axial sensor assemblies are positioned in said first axial plane, said first and said second axial sensor assemblies being differentially combined to produce a first output, and wherein a third and a fourth axial sensor assemblies are positioned in said second axial plane, said third and said fourth axial sensor assemblies being differentially combined to produce a second output, said first and said second outputs being differentially combined to produce said second scaled output.

30. A bearing monitor for a motor having a wound stator and a rotor, the rotor being mounted on radial journal bearings and axial thrust bearings within a containment housing, the wound stator being mounted external to the containment housing, comprising:

first means positioned external to the containment housing for sensing a radial displacement of the rotor, said first means generating a first scaled output signal approximately linearly related to wear of the radial journal bearings;

second means positioned external to the containment housing for sensing an axial displacement of the rotor, said second means generating a second scaled output signal approximately linearly related to wear of the axial thrust bearings; and third means responsive to said first scaled output signal and to said second scaled output signal for displaying an incremental amount of bearing wear in both an axial and a radial direction;

a target embedded in an outer periphery of the rotor in axial proximity to a first end of the rotor, and wherein said first and said second means are mounted in axial proximity to said target;

wherein said target comprises an elongate ring having a first end having a conical section and a second square end having a constant diameter section.

* * * * *